(12) United States Patent
Yabe

(10) Patent No.: US 11,371,722 B2
(45) Date of Patent: Jun. 28, 2022

(54) HOT-WATER SUPPLY SYSTEM, WATER HEATER, AND CONTROL METHOD FOR WATER HEATER

(71) Applicant: Mitsubishi Electric Corporation, Tokyo (JP)

(72) Inventor: Koji Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 217 days.

(21) Appl. No.: 16/086,816

(22) PCT Filed: Jun. 29, 2016

(86) PCT No.: PCT/JP2016/069342
§ 371 (c)(1),
(2) Date: Sep. 20, 2018

(87) PCT Pub. No.: WO2018/003042
PCT Pub. Date: Jan. 4, 2018

(65) Prior Publication Data
US 2019/0107294 A1    Apr. 11, 2019

(51) Int. Cl.
*F24D 19/10*        (2006.01)
*F24H 9/20*         (2022.01)
(Continued)

(52) U.S. Cl.
CPC ......... *F24D 19/1072* (2013.01); *F24D 15/04* (2013.01); *F24D 17/02* (2013.01);
(Continued)

(58) Field of Classification Search
USPC .................................. 237/2 B; 700/275–278
See application file for complete search history.

(56) References Cited

U.S. PATENT DOCUMENTS

| | | | |
|---|---|---|---|
| 2012/0205456 A1* | 8/2012 | Honma | F24D 19/1045 237/2 B |
| 2012/0232706 A1* | 9/2012 | Hayashida | H02J 3/14 700/282 |

(Continued)

FOREIGN PATENT DOCUMENTS

| | | |
|---|---|---|
| CN | 102734928 A | 10/2012 |
| CN | 104680241 A | 6/2015 |

(Continued)

OTHER PUBLICATIONS

International Search Report of the International Searching Authority dated Aug. 30, 2016 for the corresponding international application No. PCT/JP2016/069342 (and English translation).

(Continued)

*Primary Examiner* — Steven B McAllister
*Assistant Examiner* — John E Bargero
(74) *Attorney, Agent, or Firm* — Posz Law Group, PLC

(57) ABSTRACT

A hot-water supply system heats up water by power generated by power generation means. The hot water supply system includes a compressor and a water heat-up unit. In the hot-water supply system, the compressor compresses refrigerant and circulates the refrigerant through a refrigerant circuit. The water heat-up unit heats up water by changing, in accordance with the generated power, a rotation rate of an electric motor for driving the compressor.

19 Claims, 14 Drawing Sheets

(51) Int. Cl.
  *F24D 17/02* (2006.01)
  *F24D 15/04* (2006.01)
  *F24H 4/04* (2006.01)
(52) U.S. Cl.
  CPC .......... *F24D 19/1054* (2013.01); *F24H 4/04* (2013.01); *F24H 9/2021* (2013.01); *F24H 2240/09* (2013.01); *Y02B 30/12* (2013.01)

(56) References Cited

U.S. PATENT DOCUMENTS

| | | |
|---|---|---|
| 2012/0235478 A1 | 9/2012 | Hayashida |
| 2013/0184894 A1* | 7/2013 | Sakuma ................. H02J 3/381 |
| | | 700/298 |
| 2013/0205814 A1 | 8/2013 | Hayashida |
| 2014/0222237 A1 | 8/2014 | Hibiya et al. |
| 2015/0153714 A1 | 6/2015 | Ho |

FOREIGN PATENT DOCUMENTS

| | | |
|---|---|---|
| JP | 2013-110917 A | 6/2013 |
| JP | 2013-110951 A | 6/2013 |
| WO | 2012/090365 A1 | 7/2012 |
| WO | 2012/169115 A1 | 12/2012 |

OTHER PUBLICATIONS

Office Action dated Aug. 4, 2020 issued in corresponding JP patent application No. 2019-182327 (and English translation).
Office Action dated Aug. 21, 2020, issued for the corresponding CN patent application No. 201680086530.X and the English translation.
Office Action dated Mar. 30, 2020 issued in corresponding CN patent application No. 201680086530.X (and English translation).
Office Action (Rejection Decision) dated Feb. 19, 2021, issued for the corresponding CN patent application No. 201680086530.X and the English translation.

* cited by examiner

| MEASUREMENT DATE AND TIME | PURCHASED ELECTRICAL ENERGY (P1) [WH] | GENERATED POWER AMOUNT (P2) [WH] |
|---|---|---|
| 2016 1/1 12:00:00 | 3021 | 1081 |
| 2016 1/1 12:00:30 | 2981 | 1279 |
| 2016 1/1 12:01:00 | 3015 | 1150 |
| ⋮ | ⋮ | ⋮ |

310

HOT-WATER SUPPLY SYSTEM, WATER HEATER, AND CONTROL METHOD FOR WATER HEATER

CROSS REFERENCE TO RELATED APPLICATION

This application is a U.S. national stage application of PCT/JP2016/069342 filed on Jun. 29, 2016, the contents of which are incorporated herein by reference.

TECHNICAL FIELD

The present disclosure relates to a hot-water supply system, a water heater, and a control method for a water heater.

BACKGROUND ART

Technology using natural energy as typified by solar energy and wind energy is attracting attention in recent years, and with an increasing frequency, power-consuming households own power generators that generate power front the natural energy. Such a power-consuming household can consume the power generated by the power generator, and can supply surplus power to a commercial electrical power grid and sell the surplus power to an electric utility operator. Thus, the power-consuming household can decrease the power purchases from the commercial electrical power grid and can obtain an economic benefit.

However, a supply-demand imbalance may occur in the commercial electrical power grid due to the reverse flow supplying power back to the commercial electrical power grid from the power generator of the power-consuming household. For example, when the weather is clear on a non-workday, the demand for power from the commercial electrical power grid decreases, and also the power supplied to the commercial electrical power grid from the power generator of the power-consuming household increases.

Thus, in order to maintain the supply-demand balance of the commercial electrical power grid, electric utility operators are promoting the maintaining of a system for prior designation of time periods to the power-consuming household for suppressing the reverse flow of power. For example, the Agency for Natural Resources and Energy of Japan in 2014 announced rules for control of the output from photovoltaic power generation. These output control rules are for adjusting the output of power generated by a power generator, thereby suppressing the sale of power from the power-consuming household to the commercial electrical power grid.

Further, technology is proposed for consuming the generated power as much as possible by the power-consuming household and decreasing the reverse flow of power. For example, Patent Literature 1 discloses technology for forecasting a time period when much of the reverse flow of power occurs, and in the forecasted time period, causing operation of a heat pump-type water heater device equipped with a hot-water storage tank. Power consumption by the water heater equipped with the hot-water storage tank is generally high, and thus the technology disclosed in Patent Literature 1 can effectively decrease the reverse flow of power.

CITATION LIST

Patent Literature

Patent Literature 1: International Publication No. WO 2012/090365

SUMMARY OF INVENTION

Technical Problem

The technology disclosed in Patent Literature 1 effectively uses power by causing operation of the water heater, and thus can decrease the reverse flow of power. However, there is a demand for causing more efficient operation of the water heater to further increase utilization efficiency of power.

In order to solve the above described problem, an objective of the present disclosure is to provide a hot-water supply system and the like capable of improving utilization efficiency of power.

Solution to Problem

In order to attain the aforementioned objective, a hot-water supply system for heating up water by power generated by power generation means according to the present disclosure includes:

a compressor configured to compress refrigerant and circulate the refrigerant through a refrigerant circuit; and water heating means for heating up water by changing, in accordance with the generated power, a rotation rate of an electric motor for driving the compressor.

Advantageous Effects of Invention

According to the present disclosure, in a hot-water supply system that heats water by the generated power of the power generation means, the rotation rate of the electric motor that drives the compressor is changed in accordance with the generated power to heat water. Therefore, the present disclosure can improve the utilization efficiency of power.

DESCRIPTION OF EMBODIMENTS

Embodiments of the present disclosure are described below in detail with reference to the drawings. Throughout the drawings, components that are the same or equivalent are assigned the same reference signs.

Embodiment 1

Figure 1:
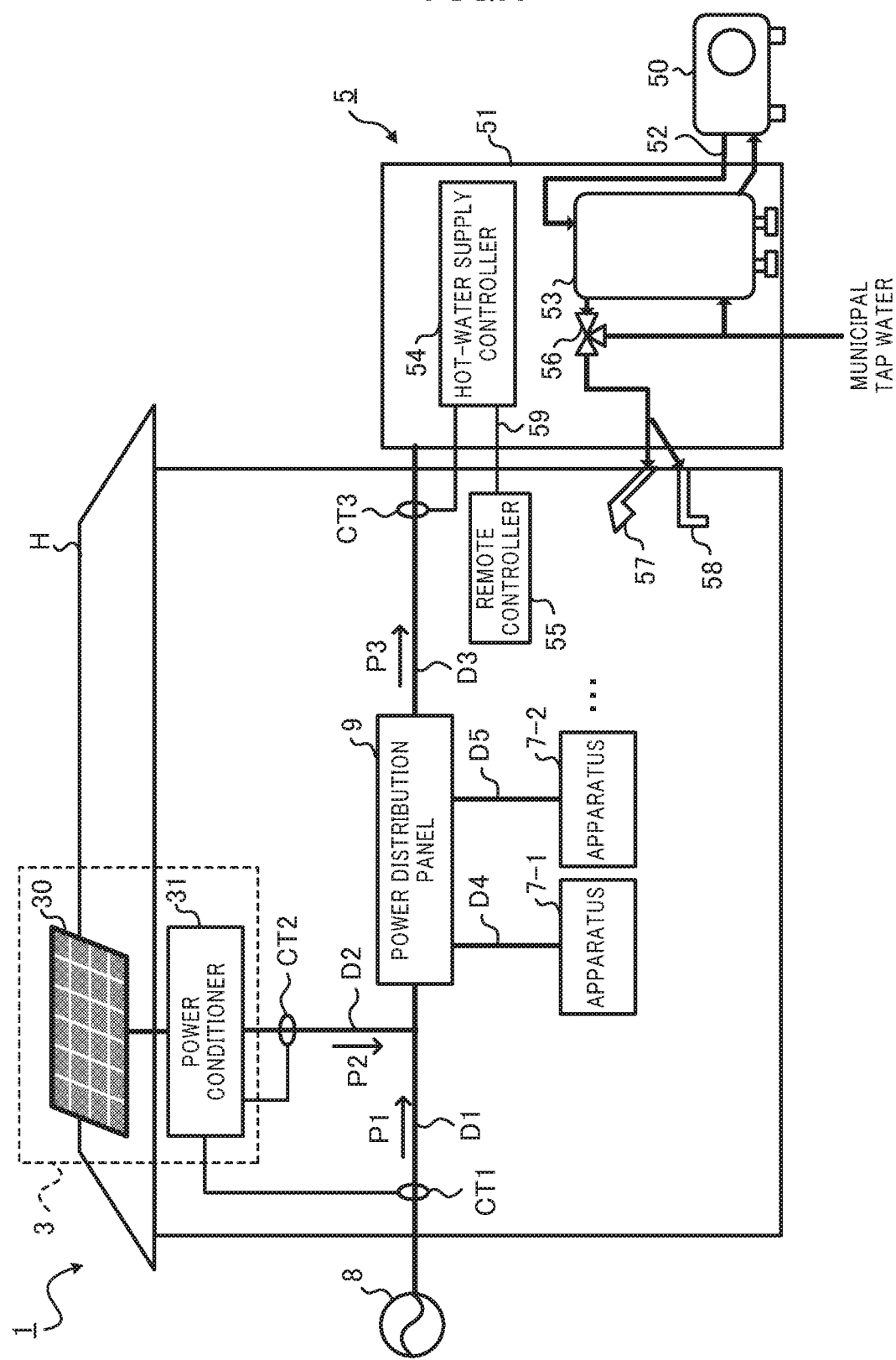
FIG. 1 is a diagram illustrating an overall configuration of a hot-water supply system according to Embodiment 1 of the present disclosure.

FIG. 1 illustrates an overall configuration of a hot-water supply system 1 in Embodiment 1 of the present disclosure. A hot-water supply system 1 is a system for managing power consumed in a home H by controlling an operation of a water heater 5 installed in the home H. The home H is a so-called general residential building and is a power-consuming area for consumption of power from a commercial electrical power grid 8 and a power generator 3. As illustrated in FIG. 1, the water-heater supply system 1 includes the power generator 3, the water heater 5, and multiple apparatuses 7 (apparatuses 7-1, 7-2, and so on).

The power generator 3 is installed in the home H and is an apparatus that generates electricity from sunlight, which is a natural energy source. Although the commercial electrical power grid 8 supplies power to an undefined number of power-consuming areas including the home H, the power generator 3 is owned by a power-consuming household of a specific power-consuming area, and is arranged to supply power to the home H that is the specific power-consuming area. This type of power generator 3 is also referred to as a distributed-type power source.

The power generator 3 includes a photovoltaic panel 30 ("photovoltaic" is abbreviated throughout as "PV") for PV power generation and a PV-power conditioner (power conditioning system) 31. The PV panel 30 is a solar panel such as a polycrystalline type solar panel, for example. The PV panel 30 is installed upon a roof of the home H and generates photovoltaic power by conversion of solar energy into electrical energy. The PV panel 30 functions as a power generation means (power generation unit). The power conditioner 31 receives the supplied power generated by the PV panel 30 and outputs the supplied power via a power line D2 to a power distribution panel 9.

Figure 2:
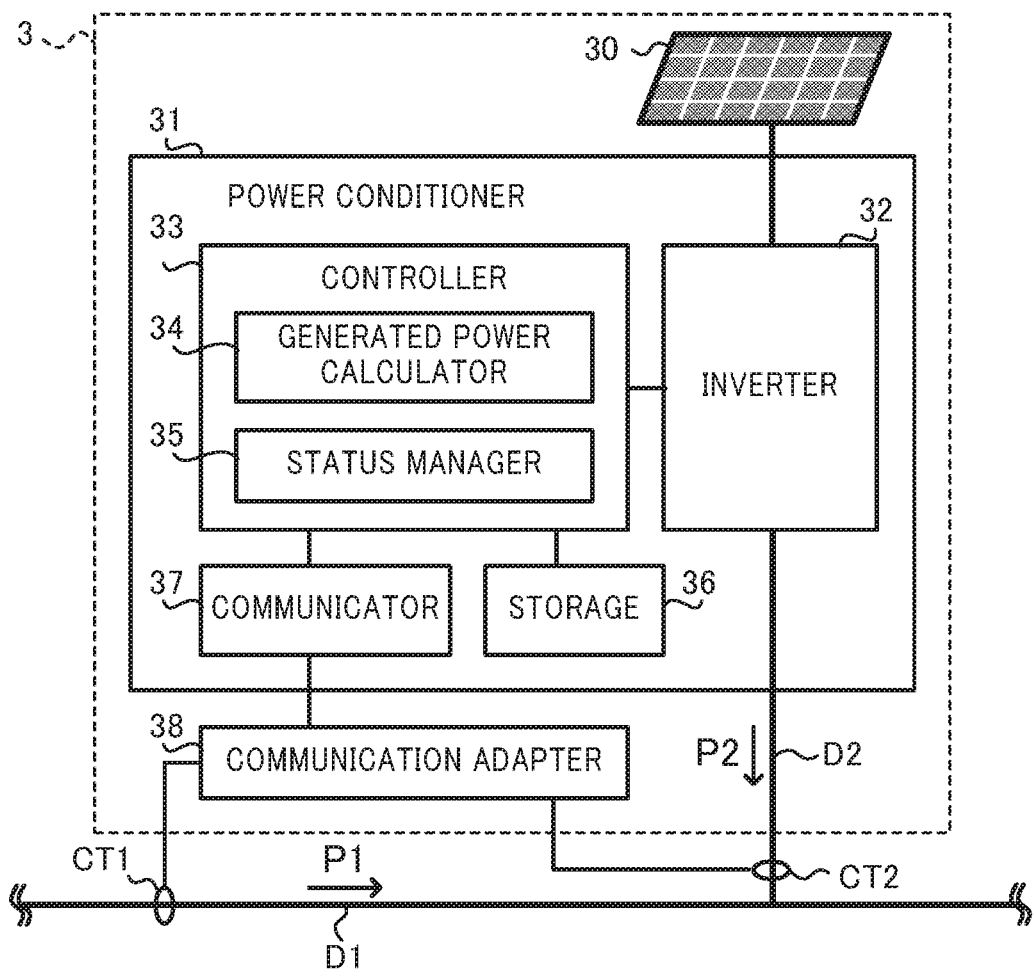
FIG. 2 is a diagram illustrating a configuration of a power conditioner.

In FIG. 2 illustrates a configuration of the power conditioner 31. As illustrated in FIG. 2, the power conditioner 31 includes an inverter 32, a controller 33, a storage 36, and a communicator 37.

The inverter 32 functions as a power converter that converts power. The inverter 32 converts direct-current power supplied from the PV panel 30 to alternating-current power at a prescribed conversion efficiency and outputs the converted power to the power line D2 so that the power can be used within the home H. In this manner, the inverter 32 supplies power generated by the PV panel 30 to the home H, which is the power-consuming area for consumption of power, and the commercial electrical power grid 8.

The controller 33 includes non-illustrated components such as a central processing unit (CPU), a read-only memory (ROM), a random-access memory (RAM), a real-time clock (RTC), and the like. The CPU is also termed a central processor, a central calculator, a processor, a microprocessor, a microcomputer, a digital signal processor (DSP), or the like. Further, the controller 33 includes a generated power calculator 34 that calculates power generated by the PV panel 30, and a status manager 35 that manages the state of the power conditioner 31. The controller 33 performs overall control of the power conditioner 31 by the CPU reading a program and data stored in the ROM, and using the RAM as a working area.

The storage 36 is nonvolatile semiconductor memory such as a flash memory, an erasable programmable ROM (EPROM), and electrically erasable programmable ROM (EEPROM), or the like, and acts as a so-called secondary storage device (auxiliary storage device). The storage 36 stores various types of programs and data used by the controller 33 for various types of processing, as well as various types of data generated or acquired by the controller 33 performing the various types of processing.

The communicator 37, under control of the controller 33, is connected to a communication adapter 38, and includes a communication interface for communication includes a communication interface that communicates with the outside via the communicator 38. The communicator 37 communicates with a hot-water supply controller 54 of the water heater 5 via a communication network installed in the home H. The communication network is, for example, a network standardized on the Energy Conservation and Homecare Network Lite (ECHONET Lite), a serial communication network based on the RS232C standard, or the like.

The communicator 37 is connected, via a communication adapter 38, to a CT1 (CT means "current transformer" hereinafter) and CT2 which are sensors that measure alternating current. The CT1 is installed at a power line D1 between the commercial electrical power grid 8 and the power distribution panel 9, and the CT2 is installed at the power line D2 between the power generator 3 and the power distribution panel 9.

The CT1 installed at the power line D1 measures a power P1 supplied from the commercial electrical power grid 8 to the home H. The power P1 corresponds to power (purchased power) purchased from the electric utility operator by the power-consuming household that requires power in the home H. The CT2 installed at the power line D2 measures the power P2 output to the power distribution panel 9 from the power generator 3. The power P2 is power generated by the power generator 3 and corresponds to power (generated power) output within the home H. The communicator 37 acquires the measurement value of the power P1 measured by the CT1 and the measurement value of the power P2 measured by the CT2.

Figure 3:
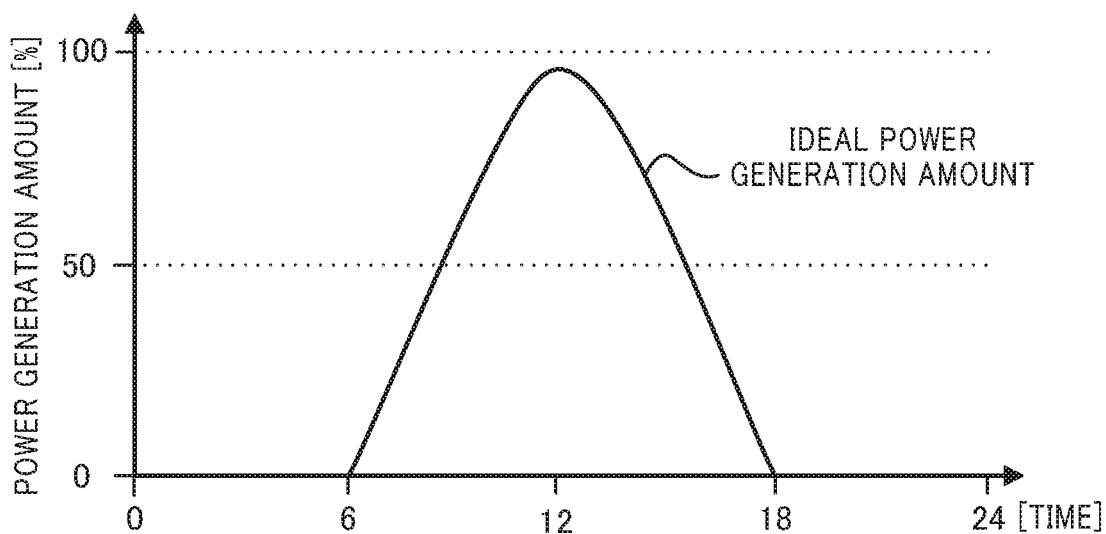
FIG. 3 is a graph illustrating transitioning of ideal power amounts of a power generator.

FIG. 3 illustrates a transitioning of a power generation amount for one day in a case in which the power generator 3 ideally generates power. In FIG. 3, the vertical axis indicates a percentage of the actual power generation amount in relation to a maximum value of an amount of power that can be generated by the power generator 3, and the horizontal axis indicates time. Since sunlight is necessary, the power generation amount by the power generator 3 increases from the morning (06:00 in the example of FIG. 3) (times in the present disclosure are indicated in 24-hour format), peaks in the afternoon (12:00 noon in the example of FIG. 3), and decreases until sunset (18:00 in the example of FIG. 3). During the time period in which sunlight is not obtainable (18:00 to 06:00 in the example of FIG. 3), power cannot be generated.

The sum of the power P1 that flows through the power line D1 and the power P2 that flows through power line D2 corresponds to total consumed power of the home H that is the power-consuming area That is, with Pc being the total consumed power of the home H, the following relationship is established: Pc=P1+P2.

When the power P2 output from the power generator 3 exceeds the total consumed power Pc (=P1+P2) of the home H, surplus power occurs at the home H. When surplus power occurs, the power-consuming household of the home H can sell power to the electric utility operator by supplying the surplus power to the commercial electrical power grid 8 as reverse flow power. The power returned to the electric utility operator from the power-consuming household by the supply of power from the home H to the commercial electrical power grid 8 is referred to as the "reverse flow power". During the period of occurrence of the reverse flow power, the power P1 flowing through the power line D1 is a negative.

Returning back to FIG. 1, the water heater 5 is described next. The water heater 5 is a hot-water storage-type water heater including a heat pump unit 50 and a tank unit 51. The heat pump unit 50 and the tank unit 51 are interconnected by water piping 52 through which hot water flows. The water heater 5 is electrically connected to the commercial electrical power grid 8 and the power generator 3 via the power line D3 branching from the power distribution panel 9, and operates by receiving power supplied from either the commercial electrical power grid 8 or the power generator 3.

Figure 4:
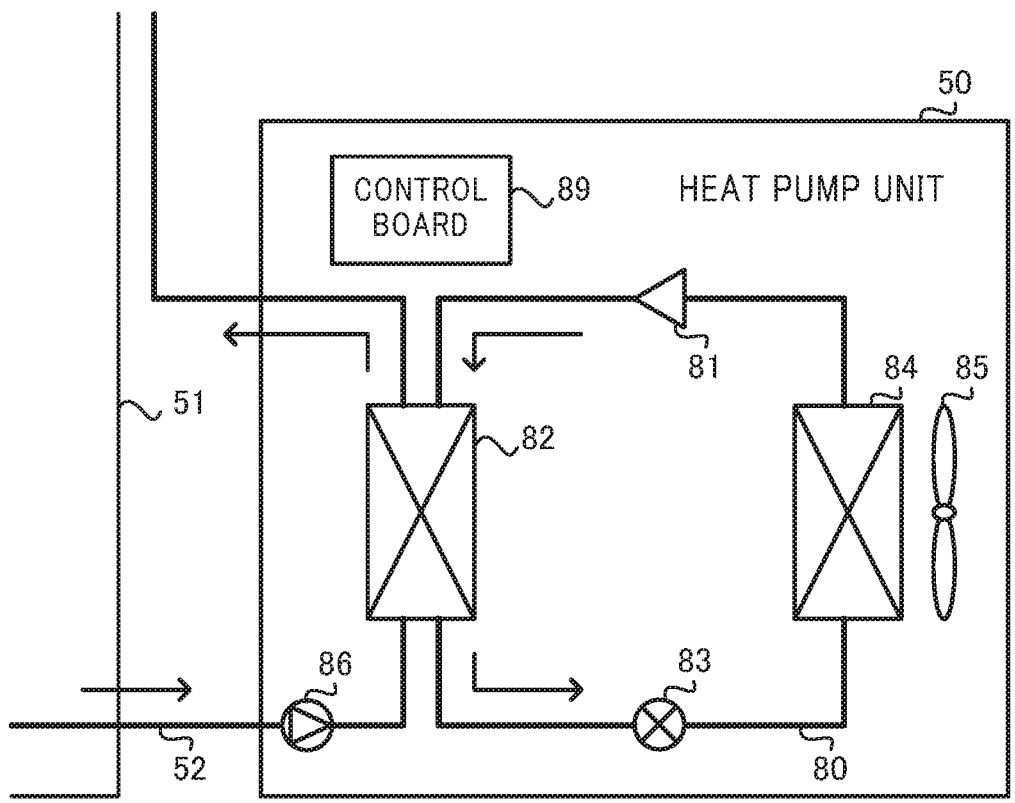
FIG. 4 is a diagram illustrating a configuration of a heat pump unit.

The heat pump unit 50 is a heat-pump type heat-source apparatus that uses, for example, carbon dioxide ($CO_2$) or hydrofluorocarbon (HFC) as a refrigerant. Using, ambient air as a heat source, the heat pump unit 50 heats up low-temperature water in a hot-water storage tank 53 to high-temperature water. As illustrated in FIG. 4, the heat pump unit 50 includes a compressor 81, a first heat exchanger 82, an expansion valve 83, a second heat exchanger 84, an air fan 85, a water pump 86, and a control board 89.

Refrigerant piping 80 connects the compressor 81, the first heat exchanger 82, the expansion valve 83, and the second heat exchanger 84 in a loop. Together these form the refrigerant circuit (through which the refrigerant circulates). The refrigerant circuit is also referred to as a heat pump or a cooling cycle, for example. The water piping 52 starts at the bottom portion of the hot-water storage tank 53, passes through the water pump 86 and the first heat exchanger 82, and then returns to the top portion of the hot-water storage tank 53. This forms a water heating circuit that circulates the hot water.

The compressor 81 compresses the refrigerant causing the refrigerant to circulate through the refrigerant piping 80 (refrigerant circuit). Specifically, the compressor 81 compresses the refrigerant flowing through the refrigerant piping 80 and causes increases in temperature and pressure of the refrigerant. The refrigerant whose temperature and pressure have risen is discharged from the compressor 81 and circulates through the refrigerant piping 80. The compressor 81 includes an electric motor that drives the compressor 81, and compresses the refrigerant by rotational movement of the rotor of the electric motor. The compressor 81 includes an inverter circuit, and changes capacity (output amount per unit of time) in accordance with the rotation rate of the electric motor. The rotation rate of the electric motor is the number of revolutions per unit of time of the electric motor, and this is also referred to as a drive frequency. The compressor 81 changes the rotation rate of the electric motor in accordance with a control value instructed by the control board 89 thereby changing the capacity.

The first heat exchanger 82 is a heat source for heating to raise a temperature of municipal tap water up to a target heat-up temperature (also referred to as hot-water storage temperature). The first heat exchanger 82 is a heat exchanger such as a plate-type heat exchanger or a double-tube type heat exchanger, and is a water-refrigerant heat exchanger that performs the exchange of heat between the refrigerant passing through the refrigerant piping 80 and water (low-temperature water) passing through the water piping 52. Heat exchange at the first heat exchanger 82 releases heat of the refrigerant, and causes the water to absorb heat and rise in temperature.

The expansion valve 83 allows expansion of the refrigerant passing through the refrigerant piping 80, and causes a lowering of temperature and pressure of the refrigerant. A degree of opening of the expansion valve 83 changes in accordance with a control value instructed by the control board 89.

The second heat exchanger 84 is an air-heat exchanger that performs the exchange of heat between the exterior air sent by the air fan 85 and the refrigerant passing through the refrigerant piping 80. Due to the heat exchange by the second heat exchanger 84, heat absorbed by the refrigerant is released to the exterior air.

The water pump 86 transfers low-temperature water from the bottom portion of the hot-water storage tank 53 to the first heat exchanger 82. The water pump 86 includes an inverter circuit and by changing the number of drive revolutions in accordance with the control value instructed by the control board 89, the water flow rate is changed when the low-temperature water is to be transferred.

The control board 89 includes non-illustrated components such as a CPU, a ROM, a RAM, a communication interface, and a readable and writeable non-volatile semiconductor memory. The control board 89 is connected in a communication-capable manner via a non-illustrated communication line with the compressor 81, the expansion valve 83, the air fan 85, and the water pump 86. Further, the control board 89 is connected in a communication-capable manner via a non-illustrated communication line with the remote controller 55 and the hot-water supply controller 54. The control board 89 controls the operation of the compressor 81, the expansion valve 83, the air fan 85, and the water pump 86 in accordance with an instruction transmitted by the remote controller 55 or the hot-water supply controller 54.

Returning back to FIG. 1, the tank unit 51 includes the hot-water storage tank 53, the hot-water supply controller 54, and a mixing valve 56. These components are contained within a metallic external case.

The hot-water storage tank 53 is formed from, for example, stainless steel or a resin. Non-illustrated thermal insulation is arranged at the exterior of the hot-water storage tank 53. Thus, the high-temperature hot water (referred to hereinafter as high-temperature water) within the hot-water storage tank 53 can be maintained at a temperature for a long time period. Examples of the temperature of the high-temperature water include 60° C., 70° C., and the like.

The hot-water supply controller 54 is a control device that provides overall control of the water heater 5. The hot-water supply controller 54 is connected in a communication-capable manner via a non-illustrated communication line with the control board 89 of the heat pump unit 50. Further, the hot-water supply controller 54 is connected in a communication-capable manner via the communication line 59 with the remote controller 55.

Figure 5:
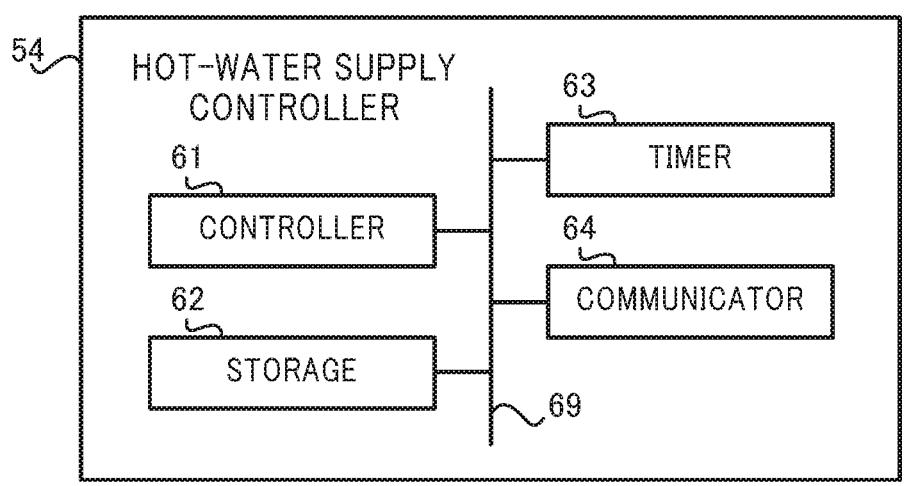
FIG. 5 is a block diagram illustrating a configuration of a hot-water supply controller.

FIG. 5 illustrates a configuration of the hot-water supply controller 54. As illustrated in FIG. 5, the hot-water supply controller 54 includes a controller 61, a storage 62, a timer 63, and a communicator 64. Each of these components is connected via a bus 69.

The controller 61 includes non-illustrated components such as a CPU, a ROM, a RANI, and the like. The CPU is also termed a central processor, a central calculator, a processor, a microprocessor, a microcomputer, a DSP, or the like. The controller 61 performs overall control of the hot-water supply controller 54 by the CPU reading a program and data stored in the ROM, and using the RAM as a working area.

The storage 62 is nonvolatile semiconductor memory such as a (lash memory, an erasable programmable ROM (EPROM), an electrically erasable programmable ROM (EEPROM), or the like, and acts as a so-called secondary storage device (auxiliary storage device). The storage 62 stores various types of programs and data used by the controller 61 for various types of processing, as well as various types of data generated or acquired by the controller 61 performing the various types of processing.

The timer 63 includes a real-time clock (RTC) and is a time-measuring device that continues to measure time even during periods when power is turned off to the hot-water supply controller 54.

The communicator 64 includes a communication interface for communication, under control of the controller 61, via the aforementioned communication network installed in the home H. The communicator 64 communicates with the power conditioner 31 of the power generator 3 via the communication network.

Further, the communicator 64 includes an interface for communication with the remote controller 55 and the control board 89 of the heat pump unit 50. The communicator 64 receives an operation command from the remote controller 55 and transmits display data to the remote controller 55. Further, the communicator 64 transmits an operation command to the heat pump unit 50. The hot-water supply controller 54 may be configured to connect to a non-illustrated external communication adapter.

The communicator 64 is connected to a CT3 which is a sensor that measures an alternating current. The CT3 is installed at the power line D3 arranged between the power distribution panel 9 and the water heater 5, and measures the power P3 supplied from the power distribution panel 9 to the water heater 5. The power P3 corresponds to power conswned by the water heater 5.

Returning back to FIG. 1, the remote controller 55 is a terminal device for displaying and providing information such as an operation state and a hot-water storage state of the water heater 5 to the user. The remote controller 55 is arranged in a bathtub or shower-equipped room, a sink-equipped room, and/or a kitchen in the home H, and receives from the user an operation input relating to water-heating, hot-water supply, or the like.

The remote controller 55 includes non-illustrated components such as a CPU, a ROM, a RAM, a readable and writeable non-volatile semiconductor memory, an input device such as a push button, a touch panel, or a touchpad, a display device such as an organic EL display or a liquid crystal display, a communication interface, and the like.

At the start of the water-heating operation, the high-temperature water within the hot-water storage tank 53 is consumed, and the municipal tap water at a temperature close to that of low-temperature water is retained in the bottom portion of the hot-water storage tank 53. By an operation of a non-illustrated pump, the low-temperature water enters the aforementioned first heat exchanger 82 of the heat pump unit 50, the temperature of the water is raised by an exchange of heat with the refrigerant, and the water becomes high-temperature water. This high-temperature water is returned to the upper portion of the hot-water storage tank 53, and within the hot-water storage tank 53, the high-temperature water in the upper portion thereof and the low-temperature water remaining in the lower portion form temperature layers, and a temperature interface layer is formed between the high-temperature water and the low-temperature water.

When the heating-up amount increases and the region of the high-temperature water becomes large, the temperature interface layer approaches the bottom portion of the hot-water storage tank 53, and a temperature (inlet water temperature) of the water entering the first heat exchanger 82 gradually rises.

A hot-water output pipe is connected to the upper portion of the hot-water storage tank 53, and the high-temperature water discharged via the hot water output pipe from the hot-water storage tank 53 is mixed with the municipal tap water by the mixing valve 56. Thus, the resultant hot water has the temperature, such as 40° C., desired by the user, and is supplied to a hot water supply terminal such as a shower 57 or a faucet 58 installed in a bathtub or shower-equipped room, a sink-equipped room, and/or a kitchen, for example. At this time, volume of the high-temperature water discharged from the upper portion of the hot-water storage tank 53 is equal to the volume of municipal tap water supplied by water pipe pressure front a water supply pipe connected to the bottom of the hot-water storage tank 53. Thus, the temperature interface layer within the hot-water storage tank 53 moves upward. When the amount of the high-temperature water becomes low, the water heater 5 performs additional heating up.

The apparatus 7 (apparatuses 7-1, 7-2, and so on) is an electrical apparatus such as an air conditioner, lighting appliance, floor heating system, refrigerator, induction heating (IH) cooker, or television, for example. The apparatuses 7-1, 7-2, and the like are arranged within the home H (including the grounds thereof), and are electrically connected to the commercial electrical power grid 8 and the power generator 3 via the power lines D4, D5, and the like branching from the power distribution panel 9.

Figure 6:
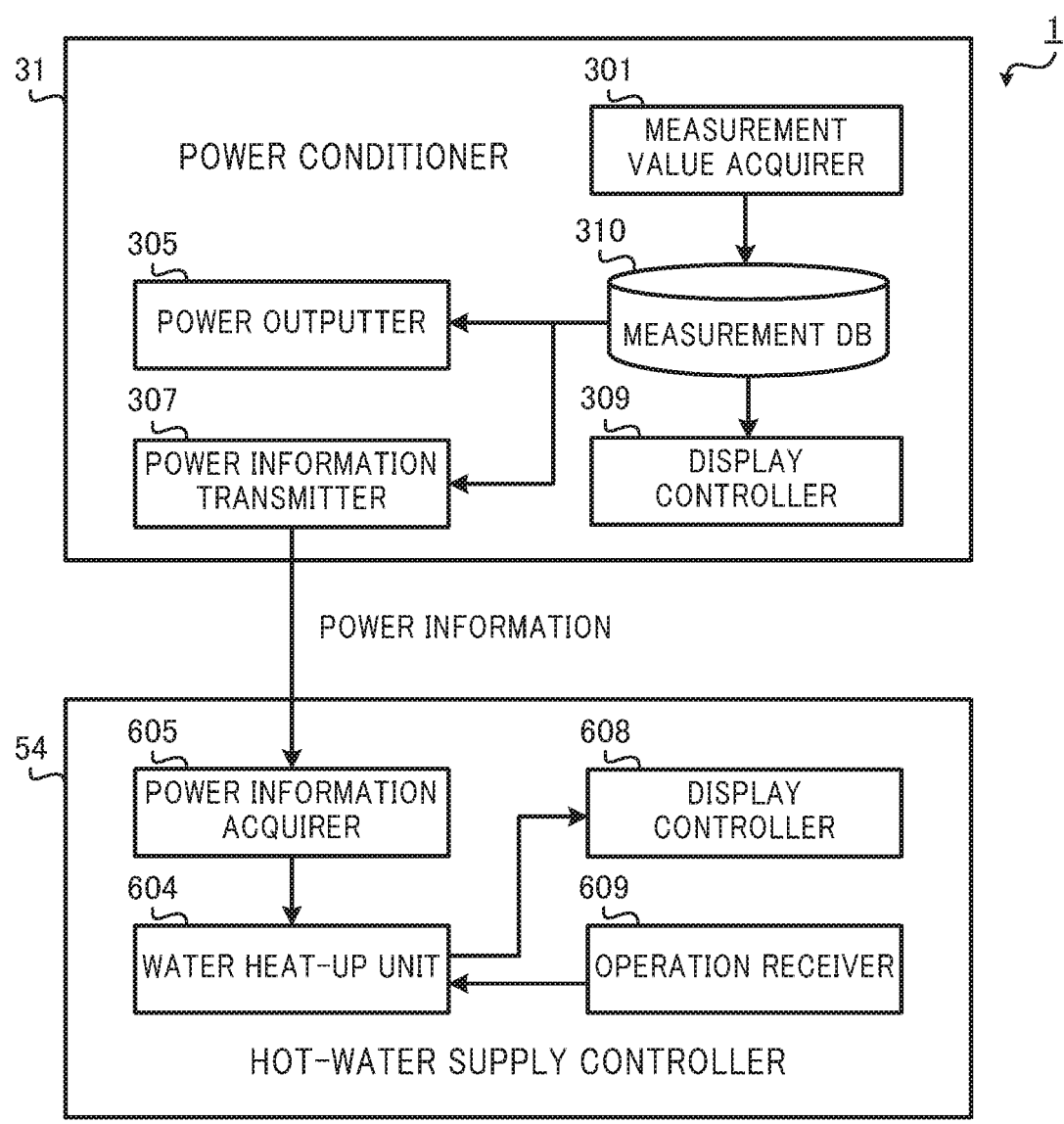
FIG. 6 is a block diagram illustrating a function configuration of the hot-water supply system according to Embodiment 1.

A functional configuration of the hot-water supply system 1 is described next with reference to FIG. 6. As illustrated in FIG. 6, the power conditioner 31 functionally includes a measurement value acquirer 301, a power outputter 305, a power information transmitter 307, and a display controller 309. Each of these functions is achieved by software, firmware, or a combination of the software and the firmware. The software and firmware are recorded as programs and are stored in the storage 36 or the ROM. Further, the controller 33 achieves the function of each of the components by the CPU executing the programs stored in the ROM or the storage 36.

The measurement value acquirer 301 acquires the measurement value of the power P1 supplied to the home H from the commercial electrical power grid 8, and the measurement value of the power P2 output by the power generator 3. As described above, the power P1 supplied to the home H from the commercial electrical power grid S is measured by the CT1 arranged at the power line D1. Also, the power P2 output by the generator 3 is measured by the CT2 arranged at the power line D2. The measurement value acquirer 301 can acquire a measurement value of reverse flow power (−P1) supplied to the commercial electrical power grid 8 among the generated power Pa, by acquiring the measurement value of the power P1 supplied to the home H from the commercial electrical power grid 8.

The measurement value acquirer 301 acquires the measurement value of the power P1 obtained by the CT1 and the measurement value of the power P2 obtained by the CT2 via the communicator 37 periodically or as necessary. The controller 33 operates cooperatively with the communicator 37 to achieve the measurement value acquirer 301 function.

Figures 7, 8:
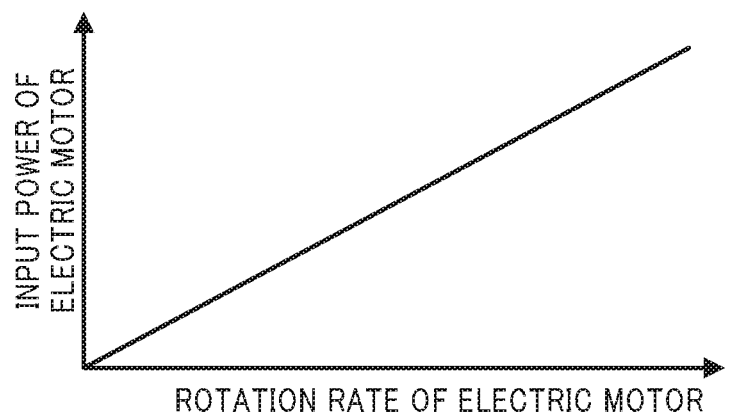
FIG. 7 is a table illustrating measurement data stored in a measurement database.
FIG. 8 is a graph illustrating a relationship between rotation rate of an electric motor and input power of the electric motor.

The power conditioner 31 includes the measurement database 310 ("database" is abbreviated throughout as "DB"). The measurement DB 310 stores the measurement values of the power P1 and P2 acquired by the measurement value acquirer 301. Every time the measurement value acquirer 301 acquires the measurement values of the power P1 and P2, the measurement DB 310 stores the history of the purchased power P1 and the generated power P2 by storing the acquired measurement values. The measurement DB 310 is constructed in a storage region within the storage 36, FIG. 7 illustrates a specific example of the measurement data that is stored in the measurement DB 310. As illustrated in FIG. 7, the measurement DB 310 stores, as a time series in chronological order, electrical energy of the purchased power P1 and electrical energy of the generated power P2. Here, the term "electrical energy" means a value of power integrated over a predetermined period. Upon acquiring the measurement values of the power P1 and P2, the measurement value acquirer 301 calculates the electrical energy of the power P1 and P2 and stores the electrical energy and phase angles consecutively in the measurement DB 310.

The power outputter 305 outputs power (generated power) generated by the PV panel 30. Specifically, the power outputter 305 controls the inverter 32, converts the power generated by the PV panel 30 from direct-current power to alternating-current power, and outputs the converted AC power into the home H. The power output by the power outputter 305 is the power obtained by multiplying the prescribed conversion efficiency by the power generated by the PV panel 30 (panel generated power). The controller 33 operates cooperatively with the inverter 32 to achieve the power outputter 305 function.

The power information transmitter 307 refers to the measurement data stored in the measurement DB 310 and generates power information indicating the history of the purchased power P1 and the generated power P2. Then the power information transmitter 307 transmits the generated power information to the water heater 5 via the communication network installed in the home H. The controller 33 operates cooperatively with the communicator 37 to achieve the power information transmitter 307 function.

The display controller 309 communicates with a non-illustrated user interface via the communicator 37 and displays on the display device of the user interface a display screen in accordance with the state. The controller 33 operates cooperatively with the communicator 37 to achieve the display controller 309 function.

Next, a functional configuration of the hot-water supply controller 54 is described. As illustrated in FIG. 6, the hot-water supply controller 54 functionally includes a water heat-up unit 604, a power information acquirer 605, a display controller 608, and an operation receiver 609. Each of these functions is achieved by software, firmware, or a combination of the software and the firmware. The software and the firmware are recorded as programs and are stored in the ROM or the storage 62, Further, the controller 61 achieves the function of each of the components by the CPU executing the programs stored in the ROM or the storage 62.

The power information acquirer 605 acquires power information from the power conditioner 31 in a period determined by a suppression instruction. The power information is information indicating the history of the purchased power P1 and the generated power P2, and this information is transmitted by the power information transmitter 307. The power information acquirer 605 acquires the power information via the communication network installed in the home H. The controller 61 operates cooperatively with the communicator 64 to achieve the power information acquirer 605 function.

The water heat-up unit 604 heats up water by communicating with the control board 89 of the heat pump unit 50 and controlling the heat pump unit 50. The expression "heats up water" means that low-temperature water within the hot-water storage tank 53 is heated up by the heat-pump unit 50 to become high-temperature water, and the high-temperature water is supplied to the hot-water storage tank 53. The controller 61 operates cooperatively with the timer 63 and the communicator 64 to achieve the water heat-up unit 604 function.

The water heat-up unit 604 heats up water by power generated by the power generator 3. Specifically, while the power generator 3 is generating power, the water heat-up unit 604 heats up the water by driving the heat pump unit 50. In doing so, the generated power is used effectively thereby minimizing the reverse flow of power to the commercial electrical power grid 8.

By converting power into heat and storing the heat as hot water, the water heater 5 can store power in the home H. Normally, the water heater 5 heats up water at night when the electricity rate is inexpensive and storing the hot water in the hot-water storage tank 53. However, the water heat-up unit 604 uses the water heater 5 as a means for storing generated power. The water heat-up unit 604 reduces the reverse flow of power by causing the heat pump unit 50 to operate while the power generator 3 is generating power, and by storing the generated power.

At this time, the water heat-up unit 604 heats up water based on the power information acquired by the power information acquirer 605. As illustrated in FIG. 3, the amount of power generated by the power generator 3 changes depending on the time period. Therefore, the generated power is required to be consumed and stored in accordance with the power generation amount in order to efficiently consume and store power. Therefore, the water heat-up unit 604 heats-up water by referencing the measurement value of the generated power P2 and changing the rotation rate of the electric motor that drives the compressor 81 in accordance with the generated power.

FIG. 8 illustrates the relationship between the rotation rate of the electric motor that drives the compressor 81 and the input power (power consumption) of the electric motor. The output power of the electric motor is determined by multiplying the rotation rate by torque, the output power of the electric motor increases as the rotation rate of the electric motor is increased. Therefore, as illustrated in FIG. 8, the input power of the electric motor increases substantially in proportion to the rotation rate. The power consumption in the water heater 5 can be adjusted by utilizing such a characteristic of the electric motor and adjusting the rotation rate of the electric motor in accordance with the power amount generated by the power generator 3.

Specifically, the water heat-up unit 604 adjusts the rotation rate of the electric motor such that the water heater 5 consumes power corresponding to the power generated by the power generator 3. Besides the input of the electric motor of the compressor 81, the water heater 5 consumes power by, for example, a fan motor that provides air, the control board 89, and the like. Nevertheless, approximately 80% of the water heater 5 is consumed by the electric motor of the compressor 81. Thus, power consumption by the water 5 can be efficiently controlled by adjusting the rotation rate of the electric motor.

Figure 9:
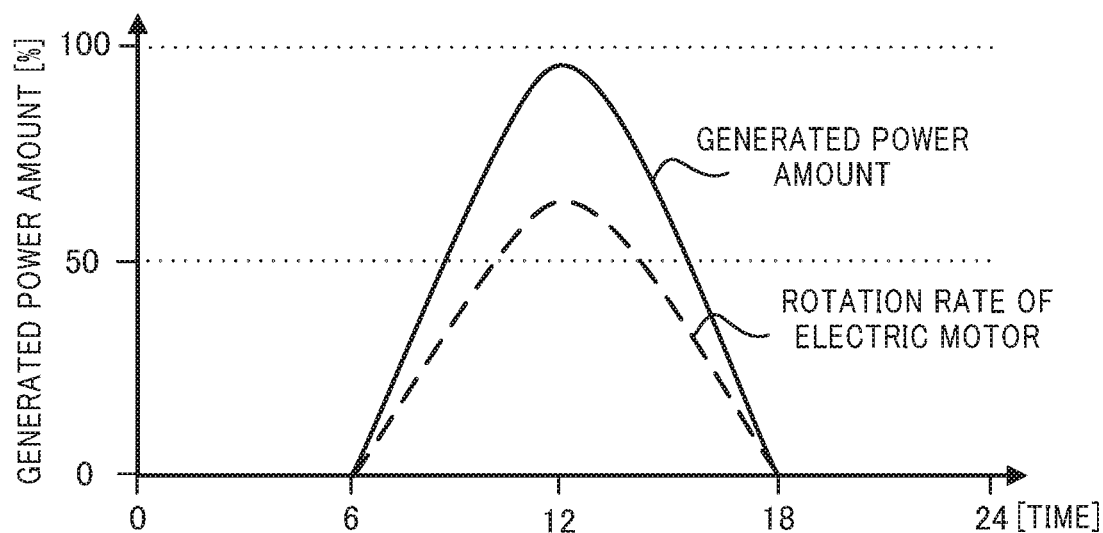
FIG. 9 is a graph illustrating transitioning of rotation rate in a case when the rotation rate of the electric motor is changed in accordance with a power generation amount of the power generator.

FIG. 9 illustrates an example in which the rotation rate is changed in accordance with the power generated by the power generator 3. As illustrated in FIG. 9, the water heat-up unit 604 increases the rotation rate as the generated power increases, and conversely, decreases the rotation rate as the generated power decreases. In other words, the water heat-up unit 604 heats up water by running the electric motor that drives the compressor 81 at a rotation rate in accordance with the generated power, specifically, the rotation rate in proportion to the generated power. In this manner, the rotation rate of the electric motor is changed in accordance with the generated power, and thus, the generated power can be efficiently consumed by the electric motor and the reverse flow of power can be reduced.

More specifically, the water heat-up unit 604 heats up water by changing the rotation rate of the electric motor in accordance with the history of the generated power. The history of the generated power is information of power generated in the past. The hot-water supply controller 54 acquires the history of generated power by acquiring, from the power conditioner 31, power information indicating past generated power P2 that is stored as a time series in chronological order in the measurement DB 310.

In FIG. 3 the amount of power generated in one day changes with time as indicated by the curve. Such a trend in the amount of generated power fluctuates somewhat depending on, for example, the weather or season, but the change is not significant. Therefore, a power generation amount for each future point of time can be forecasted based on the history of the generated power, and thus the rotation rate of the electric motor can be estimated based on the forecast. Using this, the water heat-up unit 604 specifies, based on the history of generated power on a prior date at a time that is the same as the present tune. Then, the water heat-up unit 604 heats up water by changing the rotation rate of the electric motor in accordance with the specified power generated. The rotation rate can be set in advance with high accuracy in this manner by using the history of the generated power as described.

At this time, the water heat-up unit 604 heats up water by changing the rotation rate of the electric motor in accordance with the generated power and an amount of change in power generated per unit of tune. The amount of change in power generated per unit of time is the gradient in the graph of power generated that is illustrated in FIG. 3. When the amount of power being generated is increasing (in the morning for example), the variation is an increased amount (positive value), and conversely, when the amount of power being generated is decreasing (afternoon for example) the various is a decreased amount (negative value).

The water heat-up unit 604 specifies, based on the history of the generated power, power generated on a prior date at a time that is the same as the current time, and furthermore, calculates a variation of the power generated per unit of time. Then, the power heat-up unit 604 heats up water by changing the rotation rate of the electric motor in accordance with the power obtained by adding the calculated variation to the specified generated power. Specifically, in a case in which the generated power is increasing, the water heat-up unit 604 changes the rotation rate in accordance with power greater than power generated in the past at a time that is the same as the present time, and conversely, in a case in which the generated power is decreasing, the water heat-up unit 604 changes the rotation rate in accordance with a power that is smaller than generated power in the past at a time that is the same as the current time. In this manner, a future power generation amount can be forecasted based on an electrical energy gradient, and the electric motor can be made to run efficiently.

Further, the water heat-up unit 604 heats up water by changing the rotation rate of the electric motor in accordance with the generated power and the time at which the power generated peaks in one day. The time at which the power generated peaks in one day is the time when the generated power amount is at the highest level in one day, and typically is a time near 12:00 noon. For example, since the amount of change is zero at the time when the power generated peaks, the power generation amount is not increased in the future, and thus increasing the rotation rate of the electric motor can be estimated as unnecessary. Therefore, excessive changes to the rotation rate of the electric motor can be suppressed, and the electric motor can be made to run more efficiently. Although the power generation time duration and the power generation amount fluctuates depending on the weather or season, the time at which the power generated peaks is already known, Therefore, by setting the time of the year and the time at which the power peaks in that time of the year in advance and forecasting a future power generation amount in addition to the peak time, the electric motor can be made to run efficiently.

Figure 10:
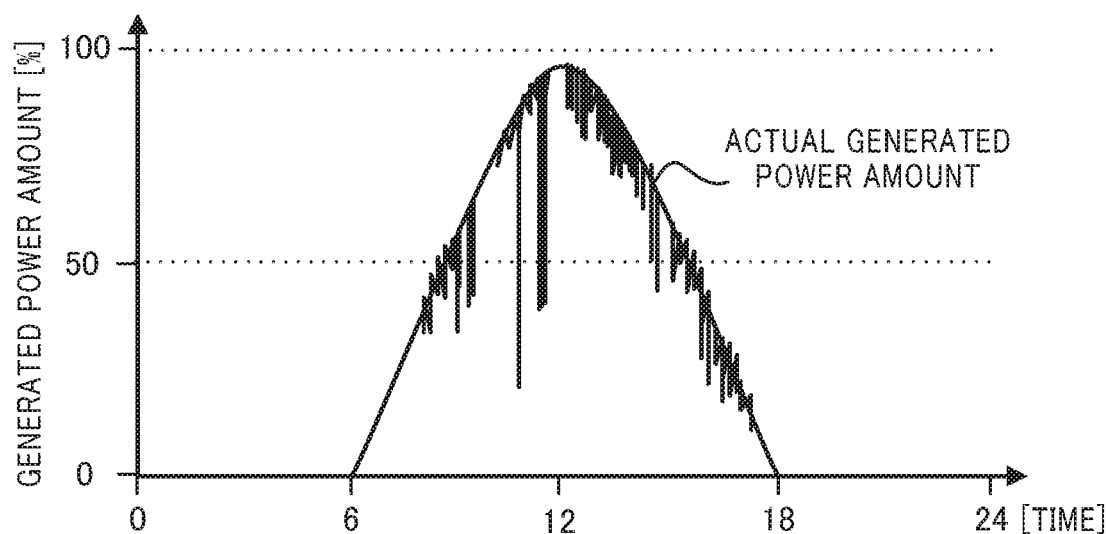
FIG. 10 is a graph illustrating transitioning of an actual power generation amount of the power generator.

Ideally, the power generation amount by the power generator 3 changes in a smooth manner as illustrated in FIG. 3, but in reality, the power generation amount changes rapidly due to sudden changes in weather for example, sudden cloud cover or rain, as illustrated in FIG. 10. Also, since the gradient of the power generation amount is a large value, when the electric motor is run in accordance with such rapid changes in the power amount, the rotation rate of the electric motor rapidly increases and decreases.

In order to avoid this, the water heat-up unit 604 heats up water by changing the rotation rate of the electric motor in accordance with an average value of the power generated in a specified duration of time. Specifically, the water heat-up unit 604 calculates an average value of power generated for each specified duration of time based on a history of generated power indicated by the power information acquired from the power conditioner 31. Then, the water heat-up unit 604 forecasts future power generation based on the calculated average value and the amount of change, and runs the electric motor at a rotation rate in accordance with the forecasted power generation amount to heat up water.

The specified duration of time for which an average value of power generation is calculated is no shorter than one minute and no greater than two hours. By averaging power generation for a duration of at least one minute, fluctuations in the power generation amount caused by sudden changes in weather can be smoothed out. Also, since power generation changes greatly approximately every two hours, averaging power generation for a duration of time not greater than two hours, the gradient of an average value can be accurately calculated.

In a case in which power generation changes substantially beyond an allowable duration of time, the value can be excluded from the average. Also, an upper limit and a lower limit of a gradient of a power generation amount can be established from the ideal amount of power generated as indicated in FIG. 3, and in a case in which the amount of change in power generated per unit of time exceeds the upper limit or lower limit, the amount of change may be excluded from the average.

Figure 11:
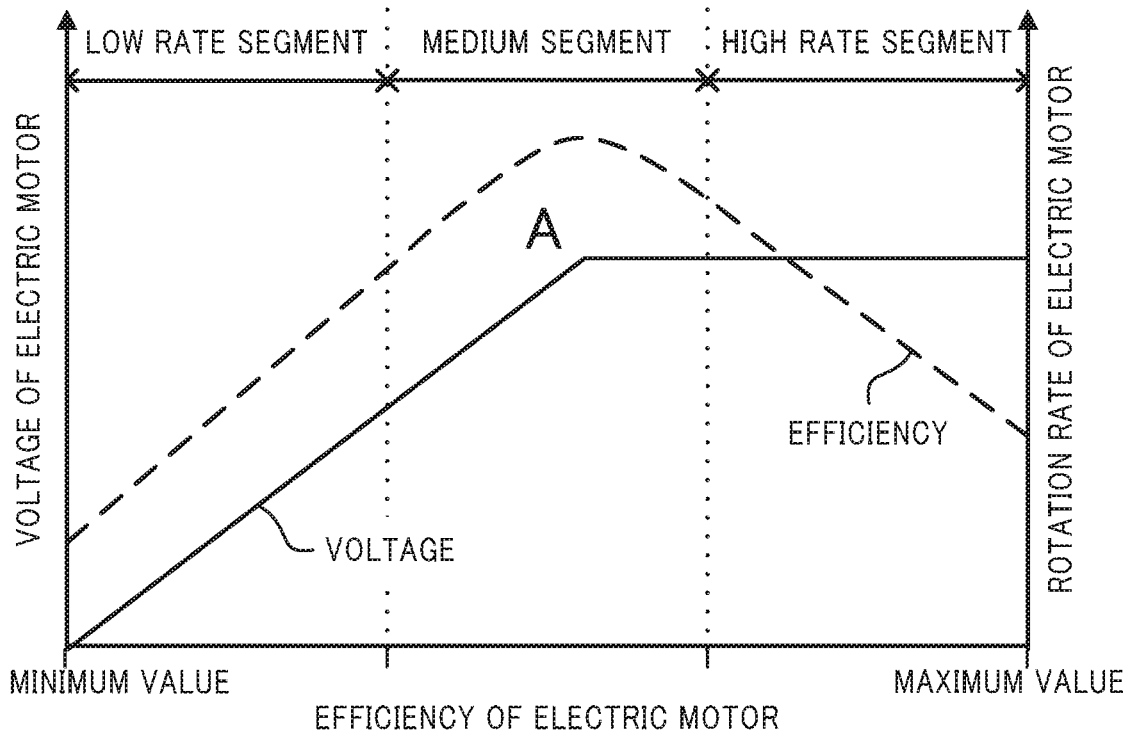
FIG. 11 is a graph illustrating a first example of a relationship between the rotation rate, voltage, and efficiency of the electric motor.

The design of the electric motor that drives the compressor 81 is described next. In FIG. 11 illustrates a relationship between the rotation rate of the electric motor and the voltage and efficiency of the electric motor. The voltage of the electric motor is a voltage that is applied to the electric motor in order to operate the electric motor. The efficiency of the electric motor is defined as the percentage of output power with respect to the input power (total consumed power) of the electric motor. As illustrated in FIG. 11, the rotation rate of the electric motor changes within a range having a minimum value and a maximum value determined by the characteristics of the electric motor. A range, including the minimum value and the maximum value, in which the rotation rate changes, is equally divided into three segments: a low rate segment, a medium segment, and a high rate segment.

The voltage applied to the electric motor is increased substantially in proportion to the rotation rate up to a predetermined maximum voltage, and when the maximum voltage is attained, the maximum voltage is maintained even if the rotation rate is further increased. That is, in a case in which the electric motor is running at a rotation rate greater than a rotation rate in which the applied voltage has reached the maximum voltage (point A in FIG. 11), the rotation rate is increased without increasing the applied voltage beyond the maximum voltage by weakening the electric field of the electric motor and increasing the rotation rate of the electric motor. This is commonly referred to as over-modulation control or field-weakening control.

The efficiency of the electric motor is the greatest near the rotation rate (point A in FIG. 11) at which the applied voltage reaches the maximum voltage, and starts to decrease when over-modulation control begins due to the rotation rate increasing beyond the point at which the applied voltage reaches the maximum voltage. Therefore, running the electric motor at a rotation rate near the point at which the applied voltage is at the maximum voltage is most efficient. In a case in which a typical nighttime water-heat up operation is performed, since there is sufficient time during nighttime, the water heater 5 takes into account the mechanical efficiency of the compressor 81 and heats up water during the time when the rotation rate is low. Therefore, preferably, the electric motor is designed such that the efficiency of the electric motor is greatest when operation is to be performed at the low rotation rate. However, in the water heater 5 that heats up water by generated power as described above, preferably, the electric motor is designed such that efficiency is the greatest at a rotation rate of the electric motor when water is heated up by generated power.

Therefore, the electric motor is designed such that the voltage that is applied to the electric motor reaches a voltage at which the electric motor begins over-modulation operation, in a segment of a plurality of segments included between the maximum value and the minimum value of the rotation rate, the segment of the plurality of segments being a segment containing the rotation rate that is during consumption by the compressor 81 of power determined in accordance with the generated power. The plurality of segments in a range including the maximum value and the minimum value of the rotation rate are three segments namely a low rate segment, a medium segment, and a high rate segment. The voltage at which the electric motor beings over-modulation is the maximum voltage and is the voltage at point A in FIG. 11.

The power determined in accordance with the generated power is the averaged power of power generated in a time period during which power is generated by the power generator 3. The time period during which power is generated by the power generator 3 is, for example, 6:00 to 18:00, which is a time period during which the sun is out. This average power is the power generated in the time period during which the sun is out averaged over a single year to smooth out season-based fluctuations.

The rotation rate of the electric motor that is during consumption by the compressor 81 of the average power of the power generated can be specified by the relationship between the rotation rate and the input power of the electric motor illustrated in FIG. 8 since the input power of the electric motor makes up a major portion of the power consumed by the compressor 81. The electric motor is designed such that the voltage to be applied to the electric motor reaches a starting voltage (maximum voltage) for the over-modulation operation in a segment containing the specified rotation rate, among the low rate segment, the medium segment, and the high rate segment.

Figure 12:
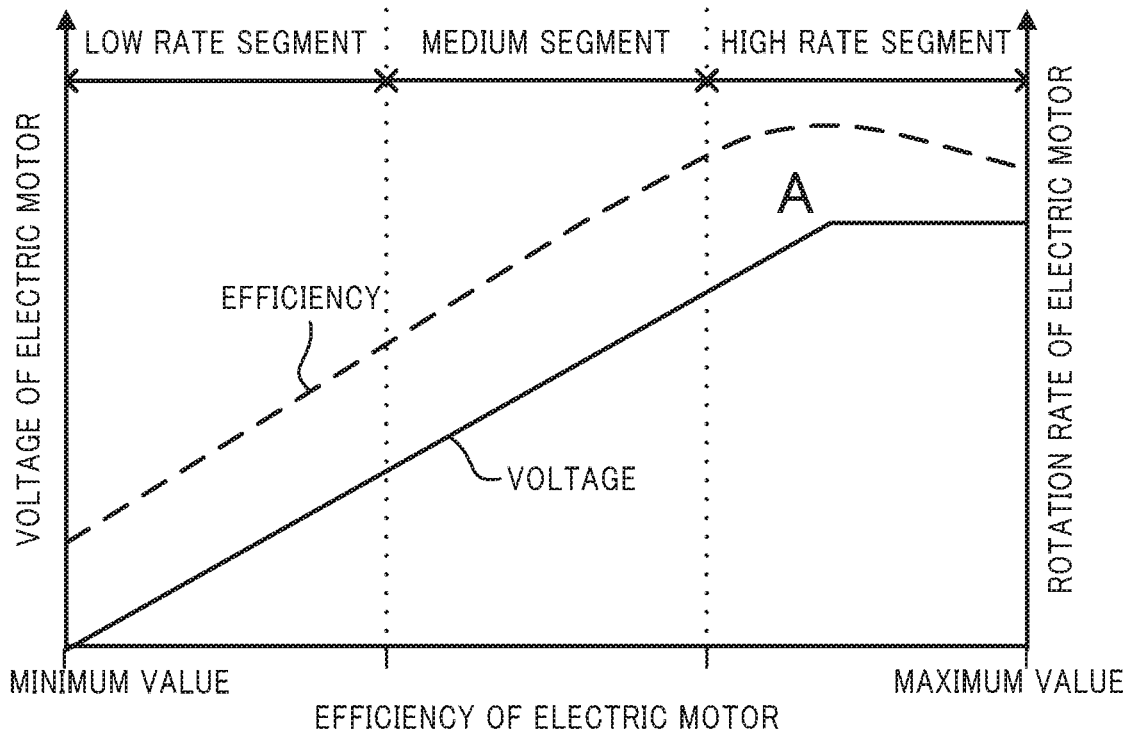
FIG. 12 is a graph illustrating a second example of a relationship between the rotation rate, voltage and efficiency of the electric motor.

Specifically, the electric motor is designed such that, in a case in which the rotation rate of the electric motor that is during consumption by the compressor 81 of the averaged power of power generated is included in the medium segment among the three segments, the applied voltage reaches the maximum voltage in the medium segment, as illustrated in FIG. 11. With respect to this, the electric motor is designed such that the applied voltage reaches the maximum voltage in the high rate segment as illustrated in FIG. 12 in the case in which the rotation rate of the electric motor that is during consumption by the compressor 81 of the averaged power of power generated is included in the high rate segment. This is similar for that in the low rate segment. In this manner, by designing the electric motor such that efficiency is the greatest during consumption by the compressor 81 of the average power of the power generated, the electric motor can be run efficiently for a long period of time. Therefore, generated power can be used more effectively.

The reason for dividing the range including the minimum value and the maximum value of the oration rate of the electric motor into multiple segments, is that the power generation amount by natural energy differs depending on the season, weather, and installation location. In other words, since the rotation rate of the electric motor can be designed within a single segment selected from among the plurality of segments, design is simplified.

In the winding method of the electric motor of the compressor 81, a concentrated winding or distributed winding may be employed, and any combination of the number of poles and the number of stator slots may be used. Also, as for the design of the electric motor, various designs are possible including a structure that utilizes rare earth magnets, ferrite magnets, and interior permanent magnets (IPM), and/or surface permanent magnets (SPM). That is, as long as voltage of the electric motor is realized, any structure may be employed for the used. However, in order to configure an efficient electric motor, it is common to use rare earth magnets that have a strong magnetic force, and an electric motor with embedded permanent magnets that can effectively utilize reluctance torque is suitable. Therefore, an electric motor with embedded permanent magnets that are rare-earth magnets is most suitable as this type of electric motor runs most efficiently. Rare-earth elements (such as dysprosium, neodymium, and/or terbium) used in rare earth magnets can be used in any amount. Further, any circuit such, for example, a step-up circuit that steps-up a bus voltage, may be used at the inverter circuit that drives the electric motor.

The display controller 608 communicates with the remote controller 55 via the communicator 64 and displays a display screen appropriate for conditions on a display device of the remote controller 55. The operation receiver 609 communicates with the remote controller 55 via the communicator 64 and receives information input by the user operating the remote controller 55. The controller 61 operates cooperatively with the communicator 64 to achieve each of the display controller 608 and the operation receiver 609 functions.

Processing executed by the hot-water supply system 1 configured in the aforementioned manner is described with reference to FIGS. 13 and 14.

Figure 13:
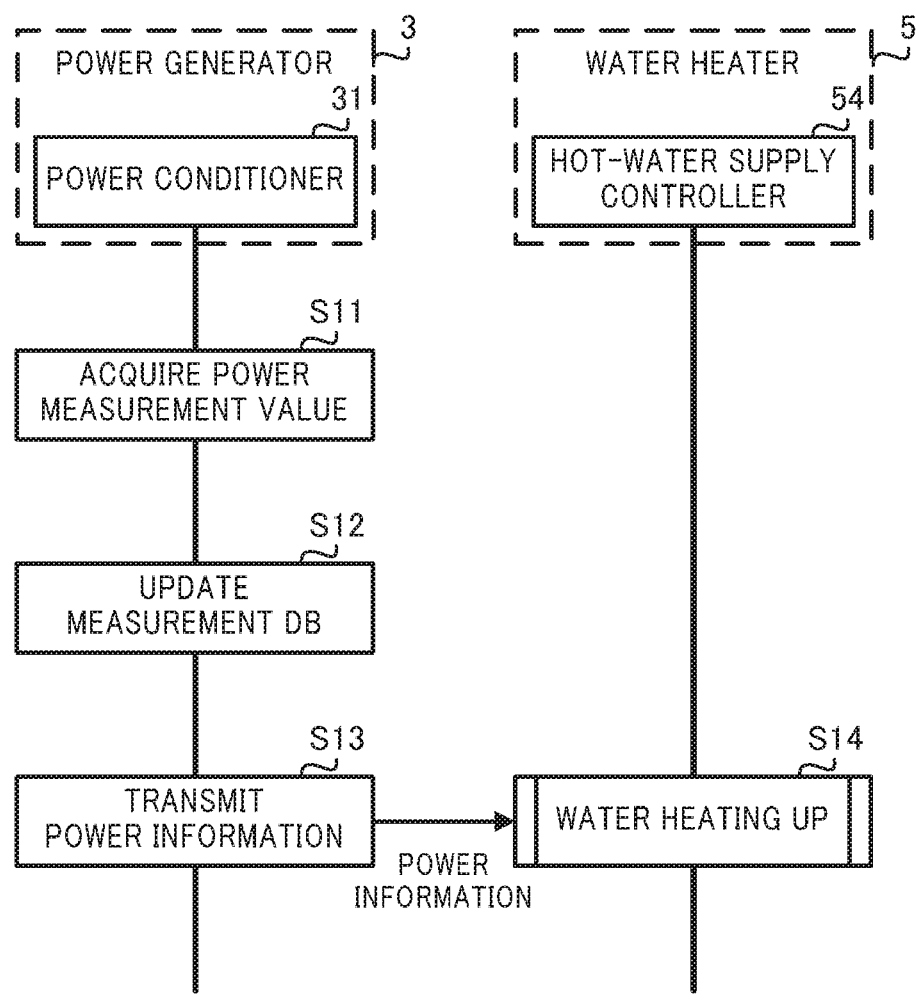
FIG. 13 is a sequence diagram illustrating an overview of processing executed in the hot-water supply system in Embodiment 1.

FIG. 13 illustrated overview of processing executed in the hot-water supply system 1. The processing indicated in FIG. 13 is executed repeatedly in a state in which the power generator 3 and the water heater 5 can be operated normally. Upon the start of the processing illustrated in FIG. 13, the power conditioner 31 acquires the measurement values of the purchased power P1 and the generated power P2 acquired by the CT1 and the CT2 (step S11). Then, the power conditioner 31 updates the measurement DB310 with the acquired measurement values (step S12). In step S11, the controller 33 of the power conditioner 31 functions as the measurement value acquirer 301.

Next, the power conditioner 31 generates power information based on the measurement values stored in the measurement DB310 and transmits the power information to the water heater 5 (step S13). The timing of transmission of the power information is the timing at which the measurement DB 310 is updated after power generation begins. Alternatively, the power conditioner 31 may transmit the power information at a predetermined time within a one day period or in accordance with a request from the water heater 5. In step S13, the controller 33 of the power conditioner 31 functions as the power information transmitter 307.

The water hot-water supply controller 54 functions as the water heat-up unit 604, and executes water heat-up processing (step S14). FIG. 14 illustrates details of the water heat-up processing of the hot-water supply controller 54 that is executed in step S14.

Figure 14:
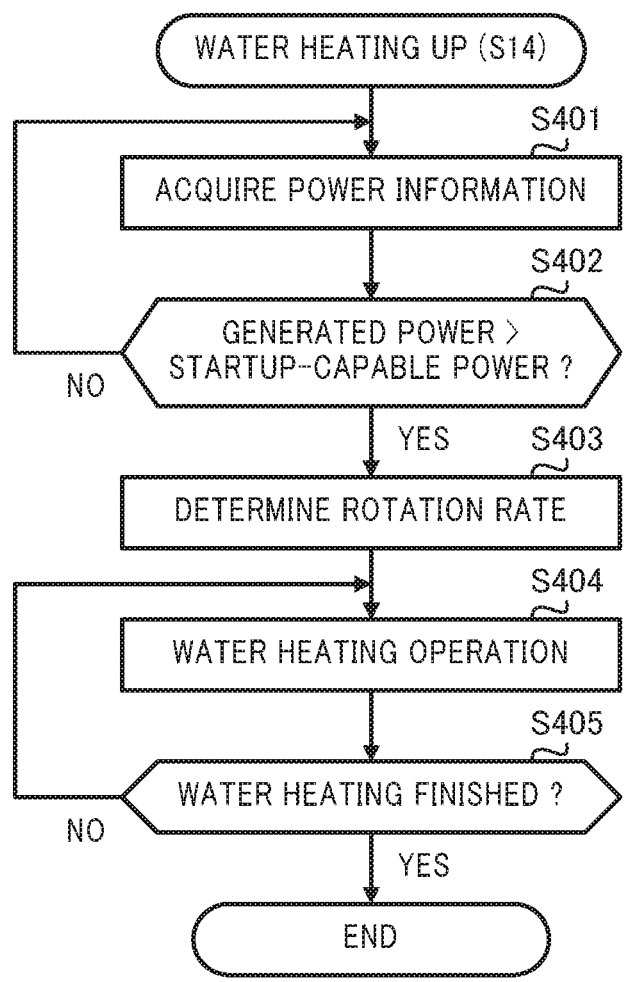
FIG. 14 is a flowchart illustrating a flow of water-heating processing executed by the hot-water supply controller.

In the water heat-up processing illustrated in FIG. 14, the controller 61 of the hot-water supply controller 54 acquires power information transmitted by the power conditioner 31 (step S401). Upon acquiring the power information, the controller 61 determines whether or not the generated power indicated in the acquired power information is greater than a predetermined startup-capable power for water heating (step S402). If the generated power is not greater than the startup-capable power (NO in step S402), then the controller 61 does not start heating up water, and waits until acquisition of the next available power information in step S401.

Conversely, if the generated power is greater than the startup-capable power (YES in step S402), the controller 61 shifts to processing to start heating up water. Prior to start of the water heating, the controller 61 determines the rotation rate of the electric motor based on the generated power (step S403), Specifically, the controller 61 calculates an average value of the generated power and a gradient based on the history of the generated power that is included in the power information acquired from the power conditioner 31. Then the controller 61 determines the rotation rate of the electric motor in accordance with the calculated average value and gradient such that power corresponding to the generated power is consumed by the water heater 5.

Upon determination of the rotation rate, the controller 61 starts water heat-up operation (step S404). Specifically, the controller 61 causes the electric motor to run at the determined rotation rate thereby driving the compressor 81 and starting supply of high-temperature water to the hot-water storage tank 53.

During execution of the water heart-up operation, the controller 61 determines whether or not the water heat-up operation is finished (step S405). If the water heat-up operation is not completed (NO in step S405), the controller 61 keeps processing in step S404. That is, the controller 61 continues the water heat-up operation while adjusting the rotation rate of the electric motor until the water heating-up is completed. Finally, upon completion the water heat-up operation (YES in step S405), the controller 61 displays on the remote controller 55 a message, an image, or the like indicating that the water heating-up is completed, and the water heat-up processing ends.

As described above, the hot-water supply system 1 in Embodiment 1 causes rotation rate of the electric motor that drives the compressor 81 to change in accordance with the generated power during water heating-up by the power generated by the power generator 3. As a result, the reverse flow of power to the commercial electrical power grid 8 can be suppressed and the generated power can be used efficiently.

In particular, the power information for controlling the rotation rate of the electric motor in the water heater 5 is generated in the power conditioner 31 and transmitted directly from the power conditioner 31 to the water heater 5. Therefore, the hot-water supply system 1, with a minimum configuration that is the power conditioner 31 and the water healer 5, can efficiently utilize the generated power.

Further, in the hot-water supply system 1 in Embodiment 1, the electric motor is designed such that the voltage applied to the electric motor reaches the maximum voltage in a segment of the plurality of segments included between the maximum value and the minimum value of the rotation rate, the segment of the plurality of segments being a segment containing the rotation rate that is during consumption by the compressor 81 of averaged power of power generated.

As a result, the electric motor can be run efficiently for a long period of time, and the generated power can be used more effectively.

Embodiment 2

Embodiment 2 of the present disclosure is described next.

Figure 15:
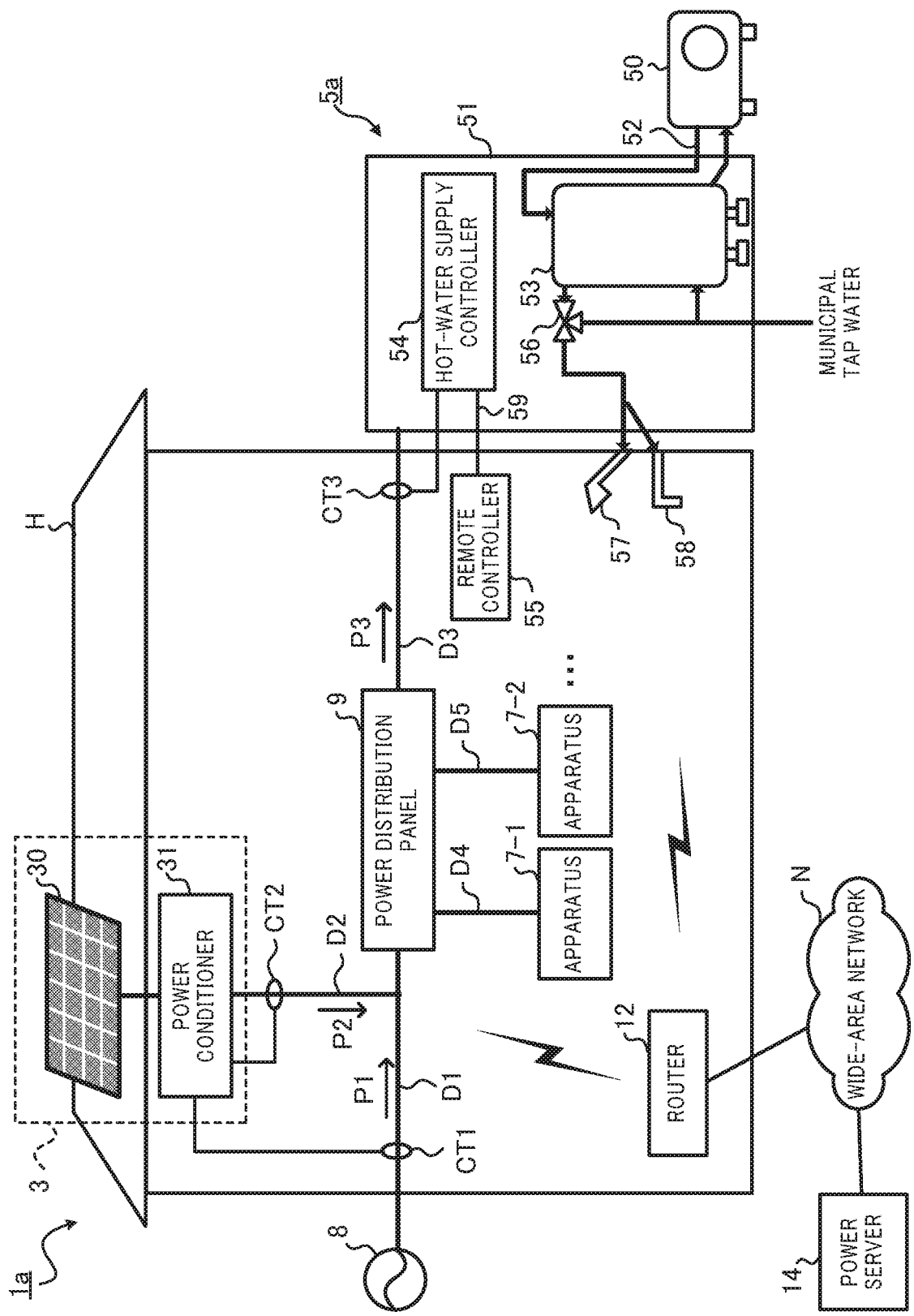
FIG. 15 is a diagram illustrating an overall configuration of a hot-water supply system in Embodiment 2 of the present disclosure.

FIG. 15 illustrates an overall configuration of a hot-water supply system 1a in Embodiment 2. As illustrated in FIG. 15, the hot-water supply system 1a includes a power generator 3a, a water heater 5a and multiple apparatuses (apparatuses 7-1, 7-2, and so on), and a router 12.

The router 12 is connected to a power server 14 via a wide-area network N that is, for example, the Internet. The router 12 is a broadband router and is capable of communication with the power server 14 via the wide-area network N. The configurations other than the router 12 are similar to that in Embodiment 1, and thus such descriptions of such configurations are omitted.

The power server 14 is a server operated by the electric utility operator that provides a commercial power supply to each of the power-consuming households via the commercial electrical power grid 8. The power server 14 is connected in a communication-capable manner via the wide-area network N with a power conditioner 31a of the power generator 3a arranged in the power-consuming area of each power-consuming household.

The power conditioner 31a of the power generator 3a and a hot-water supply controller 54a of the water heater 5a communicate with the router 12 via the communication network installed in the home H, and communicate with the power server 14 via the router 12.

Figure 16:
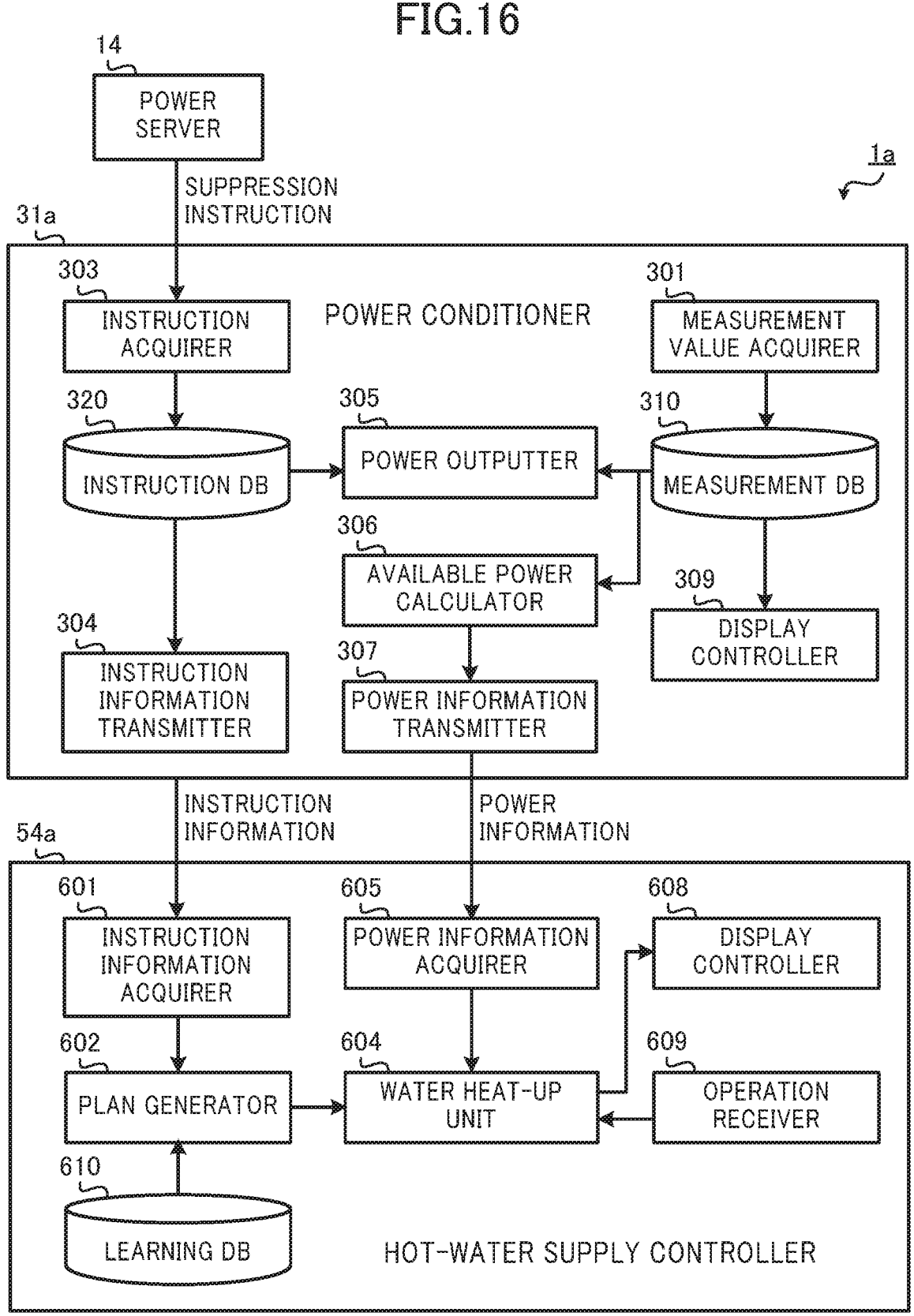
FIG. 16 is a block diagram illustrating a functional configuration of the hot-water supply system in Embodiment 2.

FIG. 16 illustrates a functional configuration of the hot-water supply system 1a in Embodiment 2. The hardware configurations of the hot-water supply controller 54a and the power conditioner 31a are the same as the configurations of the hot-water supply controller 54 and the power conditioner 31 in Embodiment 1, and thus description of these hardware configurations are omitted.

As illustrated in FIG. 16, the power conditioner 31a functionally includes the measurement value acquirer 301, an instruction acquirer 303, an instruction information transmitter 304, the power outputter 305, an available power calculator 306, the power information transmitter 307, and the display controller 309. Each of these functions is achieved by software, firmware, or a combination of the software and the firmware. The software and the firmware are recorded as programs and are stored in the ROM or the storage 36. Further, the controller 33 achieves the function of each of the components by the CPU executing the programs stored in the ROM or the storage 36.

Further, the power conditioner 31a includes the measurement database 310 ("database" is abbreviated throughout as "DB") and an instruction DB 320. The measurement DB 310 and the instruction DB 320 are constructed in storage regions within the storage 36. The functions of the measurement value acquirer 301 and the display controller 309 are similar to those in Embodiment 1, and thus descriptions of such functions are omitted.

The instruction acquirer 303 acquires an instruction for suppression of supplying, to the commercial electrical power grid 8, of the power generated by the PV panel 30. The expression "instruction to suppress supplying of the power to the commercial electric power grid 8" is an instruction (suppression instruction) for PV suppression distributed by the power server 14. The suppression instruction distributed by the power server 14 is described below.

Upon satisfaction of a predetermined condition, the power server 14, to each of the power-consuming households owning the power generator 3a, distributes an instruction to suppress the supply of power to the commercial electrical power grid 8 from the power generator 3a of the power-consuming households in the specified period, that is to say, distributes an instruction to suppress the reverse flow of power. The reverse flow of power is suppressed in this manner to prevent a supply-demand imbalance in the commercial electrical power grid 8 due to an excess supply of power from the power-consuming households to the commercial electrical power grid 8. The instruction distributed by the power server 14 to suppress the reverse flow of power is referred to hereinafter as the "suppression instruction", and controlling the output of the power generator 3a to suppress the reverse flow of power is referred to as "PV suppression". The PV suppression is also termed "output suppression", "Output control", or the like.

Specifically, the power server 14 acquires, from a meteorological organization, meteorological information such as weather information, solar insolation, sunlight hours, and the like for the location where the power generator 3a of each power-consuming household is installed, and creates a schedule for the PV suppression. Then by the day prior to execution of the PV suppression, the power server 14 distributes the suppression instruction to each power-consuming household in accordance with the created schedule. The execution period of the PV suppression is the period when the generated power from the power generator 3a becomes excessive with respect to the supply-demand state of the commercial electrical power grid 8, and for example, this period is normally in a time slot when the weather is clear and a large amount of solar insolation is anticipated. Further, the power server 14 does not distribute the suppression instruction with respect to a day for which there is no requirement for the execution of PV suppression.

The suppression instruction distributed by the power server 14 includes: time information indicating a specified period for execution of the PV suppression, and instruction value information indicating an instruction value of an Output limit of the power generator 3a during suppression of the PV power. Specifically, the suppression instruction designates information that is a specified time slot occurring on a specified day as the specified period for execution of the PV suppression, that is to say, the year, month, day, and times of day (start time and end time) for execution of the PV suppression.

The suppression instruction designates, as the instruction value of the output limit of the power generator 3a during PV suppression, a percentage (%), relative to the rated power of the power generated by the power generator 3a, of the power output to the power distribution panel 9 of the home H from the power conditioner 31a of the power generator 3a. Here, the term "rated power" of the power generated by the power generator 3a means the maximum power that can achieve safe output of power under appropriate conditions for the power generator 3a, and this specifically corresponds to the smaller of the rated capacity of the PV panel 30 and the rated capacity of the power conditioner 31a.

Figure 17:
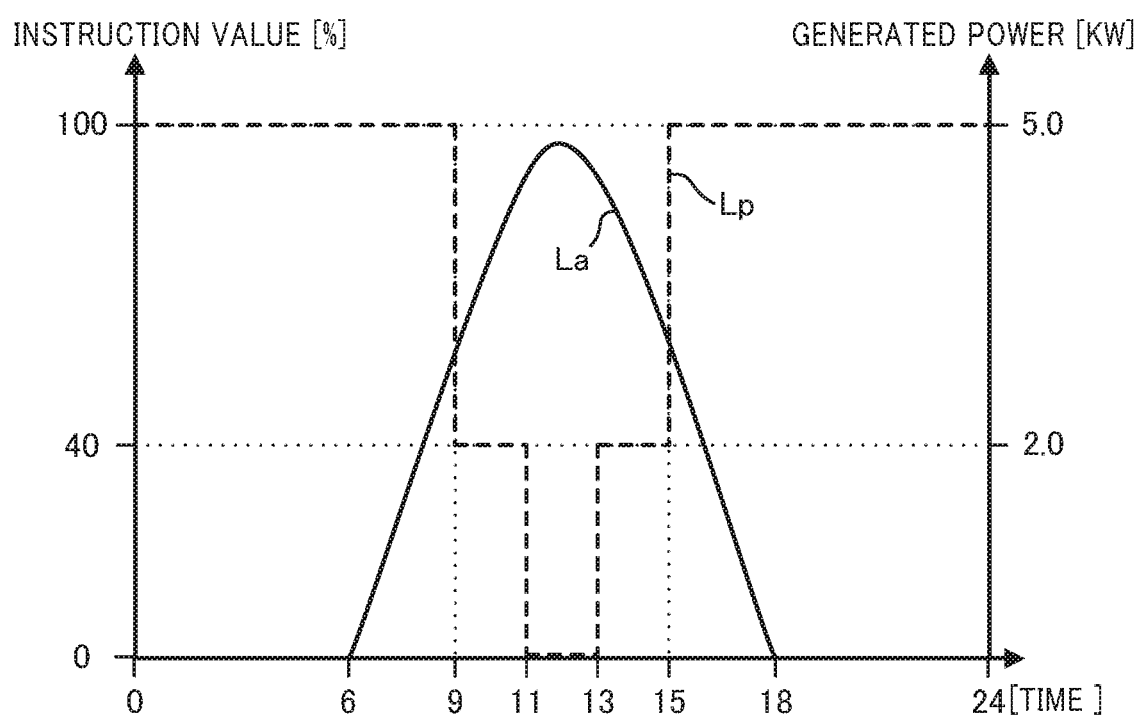
FIG. 17 is a diagram for description of a suppression instruction distributed by a power server.

FIG. 17 illustrates a specific example of a suppression instruction distributed by the power server 14. The solid line La in FIG. 17 indicates the trending of generated power from the power generator 3a occurring in the case in which there is no instruction for the PV suppression, and this plot indicates a value that is large during the daytime and peaks at noon when solar insolation is high. In contrast, the dashed-line plot Lp in FIG. 17 indicates the trending of the instruction value of the output limit of the power generator 3a as designated on the basis of the suppression instruction.

In the example of FIG. 17, in time slots from 09:00 to 11:00 and from 13:00 to 15:00 (times in the present disclosure are indicated in 24-hour format), suppression of the power output from the power generator 3a to 40% of the rated power (for example, 2.0 kW relative to a rated power of 5.0 kW) is designated. Further, in the time slot from 11:00 to 13:00, suppression of the power output from the power generator 3a to 0% of the rated power of the power generator 3a is designated, that is to say, the designation is to output none of the power generated by the power generator 3a. In other words, in the time slot from 09:00 to 15:00 when the instruction value is less than 100%, the power output from the power generator 3a is suppressed. In contrast, in the time slots from 00:00 to 09:00 and from 15:00 to 24:00 when the instruction value is 100%, there is effectively no suppression of the power output from the power generator 3a. Hereinafter, the value indicating the instruction value by the units of power is referred to as the "instruction power".

Upon the power server 14 distributing the suppression instruction, the instruction acquirer 303 acquires the distributed suppression instruction via the wide-area network N and the communicator 37. Upon the instruction acquirer 303 acquiring the suppression instruction, the content of the PV suppression, such as the instruction value and the schedule designated by the acquired suppression instruction, is stored in the instruction DB 320. The controller 33 operates cooperatively with the communicator 37 to achieve the instruction acquirer 303 function.

Again with reference to FIG. 16, the instruction DB 320 stores the content of the suppression instruction acquired by the instruction acquirer 303. The expression "content of the suppression instruction" means specifically the instruction value and the schedule of the PV suppression designated by the suppression instruction. The instruction DB 320 updates the stored instruction value and the stored schedule of the PV suppression each time the instruction acquirer 303 acquires the suppression instruction from the power server 14.

In the case in which the instruction acquirer 303 acquires the suppression instruction, the instruction information transmitter 304 transmits to the water heater 5a instruction information indicating the content of the suppression instruction. The expression "content of the suppression instruction" means specifically that there is an instruction for PV suppression, the date and time of the PV suppression, and the like. In the case in which the instruction acquirer 303 acquires the suppression instruction, the instruction information transmitter 304 generates instruction information indicating the content of such a suppression instruction. Then the instruction information transmitter 304, by 23:00 on the day prior to the day of execution of the PV suppression, transmits the generated instruction information to the water heater 5a via the communication network installed in the home H. The controller 33 operates cooperatively with the communicator 37 to achieve the instruction information transmitter 304 function.

In the case in which the instruction acquirer 303 acquires the suppression instruction, in the period designated by the suppression instruction, the power outputter 305 outputs electric power less than the generated power among the electric power generated by the PV panel 30. The expression "the period designated by the suppression instruction" means the time slot of execution of the PV suppression as instructed in accordance with the suppression instruction.

Upon arrival of the execution period for PV suppression, the power outputter 305, by controlling the inverter 32, suppresses, among the generated power supplied to the power conditioner 31a from the PV panel 30, the power output in the power line D2. As a result, all electric power among the electric power generated by the PV panel 30 is not output to the power line D2, electric power is output that is less than the generated power, and the remaining power is not output. Further, the meaning of the expression "outputting electric power less than the generated power" includes entirely not outputting electric power. The controller 33 operatives cooperatively with the inverter 32 to achieve the power outputter 305 function.

The power outputter 305 does not control output from the power conditioner 31a during the period in which PV suppression is not executed. In other words, of the power (generated power) generated by the PV panel 30, the power outputter 305 outputs all of the generated power capable of output to within the home H. Conversely, when the PV suppression is being executed, the power outputter 305 suppresses the output from the power conditioner 31a.

Hereinafter, the power capable of being output by the power conditioner 31a is indicated hereinafter as "generated power Pa" and this is distinguished from the power P2 (output power) actually output from the power conditioner 31a. During the period in which the PV suppression is not executed, the output power P2 is equal to the generated power Pa, whereas during the period in which the PV suppression is being executed, the output power P2 becomes smaller than the generated power Pa. In the period in which the PV suppression is executed, the difference (Pa minus P2) between the generated power Pa and the output power P2 is lost as lost power (power generation loss).

The power outputter 305 executes phase-advance phase control as the method for suppression of the output power. That is, in the execution period of the PV suppression, the power outputter 305 suppresses the output of power by offsetting the phase of current from the phase of voltage. More specifically, when a total consumed power Pc of the home H is less than the instruction power in the period in which the PV suppression is executed, the power outputter 305 suppresses the output power P2 down to the instruction power (output suppression mode), Conversely, when the total consumed power Pc of the home H is greater than the instruction power in the period in which the PV suppression is executed, the power outputter 305 suppresses the output power P2 to be merely equivalent to the total consumed power Pc, rather than down to the instruction power (reverse flow power zero mode).

The available power calculator 306 calculates the available power. The term "available power" is the excess of power that the power conditioner 31a is capable of outputting among the power Pa generated by the PV panel 30. In other words, in the execution period of PV suppression, the available power is the power that, on the basis of output suppression, is not output from the power conditioner 31a even though the apparatuses in the home H including the water heater 5a are capable of consumption. The function of the available power calculator 306 is achieved by the generated power calculator 34 included in the controller 33.

The available power calculator 306 calculates, as the available power, the difference between the power Pa generated by the PV panel 30 and the output power P2 output by the power outputter 305 in the execution period of PV suppression. The output power P2 occurring in the period of PV suppression can be acquired as a measurement value by the measurement value acquirer 301. In contrast to this, the power Pa generated by the PV panel 30 cannot be measured directly while the PV suppresses is being executed. Therefore, the available power calculator 306 calculates the power factor of the output power P2 based on the phase difference between voltage and current occurring in the output power P2, and calculates the estimation value of the generated power Pa occurring in the execution period of PV suppression by multiplying together the calculated power factor and a rated power of the generated power Pa. The rated power of the generated power Pa is stored beforehand in the ROM, the storage 36, or the like.

The available power calculator 306 calculates the available power by subtracting from the calculated estimation value of the generated power Pa the measurement value of the output power P2. For example, if the rated power of the generated power Pa is 6.0 kW, the power factor is 0.9, and the measurement value of the output power P2 is 4.0 kW, then the available power calculator 306 calculates the available power to be 1.4 kW (=6.0 kW×0.9−4.0 kW).

The power information transmitter 307 transmits power information indicating the available power calculated by the available power calculator 306 to the water heater 5a. Specifically, the power information transmitter 307 generates power information indicating the difference between the power Pa generated by the PV panel 30 and the power P2 output by the power outputter 305 in the execution period of PV suppression. Next, the power information transmitter 307 transmits the generated power information to the water heater 5a via the communication network installed in the home H. The controller 33 operates cooperatively with the communicator 37 to achieve the power information transmitter 307 function.

The functional configuration of the hot-water supply controller 54a is described next. As illustrated in FIG. 16, the hot-water supply controller 54a functionally includes an instruction information acquirer 601, a plan generator 602, the water heat-up unit 604, the power information acquirer 605, the display controller 608, and the operation receiver 609. Each of these functions is achieved by software, firmware, or a combination of software and firmware. The software and firmware are recorded as programs and are stored in the ROM or the storage 62. Further, the controller 61 achieves the function of each of the components by the CPU executing the programs stored in the ROM or the storage 62. The functions of the display controller 608 and the operation receiver 609 are similar to that in FIG. 1, and thus description of such functions is omitted.

The instruction information acquirer 601 acquires instruction information transmitted by the power conditioner 31a. The instruction information is information transmitted by the instruction information transmitter 304, such as the fact that there is a PV suppression instruction, the date and time of the PV suppression, and the like. The instruction information acquirer 601 acquires the instruction information via the communication network installed in the home H. The controller 61 operates cooperatively with the communicator 64 to achieve the instruction information acquirer 601 function.

Upon the instruction information acquirer 601 acquiring the instruction information, the plan generator 602 generates a water heat-up plan on the basis of the instruction information. Per the water heat-up plan, the start time and the end time of the water heat-up operation, the water heat-up period, the heating-up amount, the water heat-up capacity, and the like are designated. Upon arrival of a predetermined time (23:00 for example) within a one day period, the plan generator 602 refers to a learning DB 610 and generates the water heat-up plan for the following day. The generated plan is stored in a location such as RAM or the storage 62. The controller 61 operates cooperatively with the storage 62 to achieve the plan generator 602 function.

The hot-water supply controller 54a includes the learning DB 610. The learning DB 610 is constructed in the storage region within the storage 62. The learning DB 610 is a database that contains data such as the heating-up amount, the used amount (supplied hot-water amount), and the like for hot water up to the previous day. The plan generator 602 forecasts the amount of hot water to be used on the following day, by referring to the heating-up amount, the used amount, and the like stored up to the previous day in the learning DB 610. Then, the plan generator 602 determines a target heating-up amount from the used amount of hot water forecast for the following day and the amount of hot water remaining in the hot-water storage tank 53.

Upon determination of the heating-up amount, the plan generator 602 determines a water heat-up time for hot water. Specifically, in the case in which PV suppression is not executed on the following day, the plan generator 602 generates a water heat-up plan that plans for all of the water of the determined heating-up amount to be heated at night when the purchased-power unit price is inexpensive. In contrast, in the case in which PV suppression is to be executed on the following day, in order to reduce the lost power that occurs during PV suppression, the plan generator 602 generates a water heat-up plan that heats up a portion of a determined heating-up amount of water in the nighttime, and heats up the remaining portion during PV suppression in the daytime.

The water heat-up unit 604 heats up water in accordance with the water heat-up plan generated by the plan generator 602. Specifically, in the case in which the instruction information acquirer 601 does not acquire instruction information for execution of PV suppression on the following day, the water heat-up unit 604 at nighttime heats up all the water of the target heating-up amount in accordance with a nighttime water heat-up plan generated by the plan generator 602. In contrast, in the case in which the instruction information acquirer 601 acquires instruction information for execution of PV suppression on the following day, the water heat-up unit 604 heats up a first amount of water at nighttime prior to the execution period of PV suppression determined by the instruction information, and in the daytime that is the execution period of the PV suppression, heats up a second amount of water in accordance with the available power.

The power information acquirer 605, in the period designated by the suppression instruction, acquires the power information from the power conditioner 31a. The power information is information, transmitted by the power information transmitter 307, that is based on the difference between the power Pa generated by the PV panel 30 in the execution period of PV suppression and the power P2 output by the power outputter 305, and the power information is specifically information indicating the available power of the power generator 3a. The power information acquirer 605 acquires the power information via the communication network installed in the home H. The controller 61 operates cooperatively with the communicator 64 to achieve the power information acquirer 605 function.

The water heat-up unit 604 heats up water by changing the rotation rate of the electric motor in accordance with the available power indicated in the power information acquired by the power information acquirer 605 in the period designated by the suppression instruction. That is, the water heat-up unit 604 heats up water by changing the rotation rate of the electric motor in accordance with the difference between the power Pa generated by the PV panel 30 and the power P2 output by the power outputter 305. The processing of the water heat-up unit 604 is similar to that described in Embodiment 1, except for replacement of the term "generated power" by the term "available power". Therefore, a detailed description of the processing is omitted here.

Processing executed by the hot-water supply system 1*a* configured in the aforementioned manner is described with reference to FIG. 18 and FIG. 19.

Figure 18:
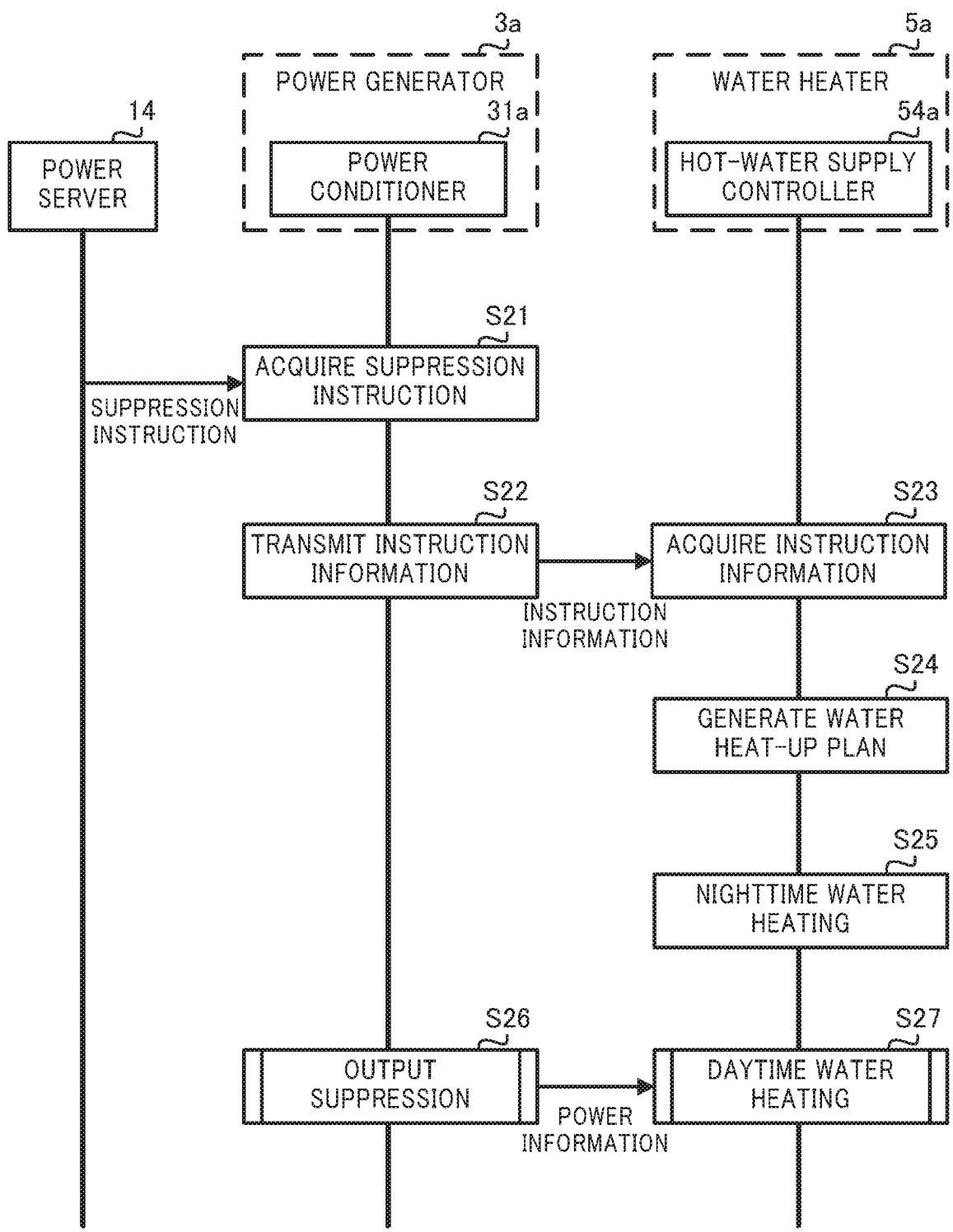
FIG. 18 is a sequence diagram illustrating an overview of processing executed in the hot-water supply system in Embodiment 2.

FIG. 18 illustrates an overview of processing executed in the hot-water supply system 1*a*. FIG. 18 illustrates processing executed by the power server 14, the power conditioner 31*a* of the power generator 3*a*, and the hot-water supply controller 54*a* of the water heater 5*a* from the distribution by the power server 14 of a single instance of PV suppression instruction until the end of the execution of PV suppression. If the PV suppression instruction is distributed multiple times by the power server 14, the processing illustrated in FIG. 18 is executed in parallel for each PV suppression.

After the determination to execute PV suppression and the determination of the schedule and detailed contents of such PV suppression, the power server 14 distributes to each of the power-consuming households an instruction for PV suppression (suppression instruction). Upon distribution of the suppression instruction from the power server 14, the power conditioner 31*a* acquires, via the wide-area network N, the distributed suppression instruction (step S21), In step S21, the controller 33 of the power conditioner 31*a* functions as the instruction acquirer 303.

In step S21, the power conditioner 31*a* may acquire the suppression instruction at the timing of distribution of the suppression instruction from the power server 14. Alternatively, upon arrival of a predetermined timing such as once or twice per day, the power conditioner 31*a* may acquire the suppression instruction from the power server 14 by accessing the power server 14.

Upon acquiring the suppression instruction, the power conditioner 31*a* waits until the day prior to the day in which PV suppression is executed. Then upon arrival of the day prior to the day in which PV suppression is executed, the power conditioner 31*a* transmits instruction information indicating the content of the acquired suppression instruction to the water heater 5*a* (step S22). Specifically, the power conditioner 31*a* generates instruction information indicating the fact that a PV suppression instruction exists, the data and time of such suppression, and the like, and transmits the generated instruction information to the water heater 5*a*. In step S22, the controller 33 of the power conditioner 31*a* functions as the instruction information transmitter 304.

In the case in which the power conditioner 31*a* transmits the instruction information in step S22, the hot-water supply controller 54*a* acquires the transmitted instruction information (step S23). In step S23, the controller 61 of the hot-water supply controller 54*a* functions as the instruction information acquirer 601.

Upon acquiring the instruction information, the hot-water supply controller 54*a* generates the water heat-up plan in accordance with the acquired instruction information (step S24). Specifically, the hot-water supply controller 54*a*, on the basis of the heating-up amount and the used amount up to the previous day stored in the learning database 610, forecasts the amount of hot water to be used on the following day. Then the hot-water supply controller 54*a* determines the heating-up amount on the basis of the used amount of hot water forecast for the following day and the amount of hot water remaining in the hot-water storage tank 53.

In the case in Which PV suppression is not executed on the following day, the hot-water supply controller 54*a* generates a water heat-up plan for nighttime that heats up the entire determined heating-up amount of water. Conversely, in the case in which PV suppression is to be executed on the following day, the hot-water supply controller 54*a* generates water heat-up plan that heats up a part of the water of the determined heating-up amount at nighttime, and heats up the remainder in the daytime during PV suppression. In step S24, the controller 61 of the hot-water supply controller 54*a* functions as the plan generator 602.

Upon generation of the water heat-up plan, the hot-water supply controller 54*a* executes the nighttime: water heating-up in accordance with the generated plan (step S25). In step S25, the controller 61 of the hot-water supply controller 54*a* functions as the water heat-up unit 604.

Thereafter, upon arrival of the time for the start of PV suppression, the power conditioner 31*a* executes output suppression of the generated power (step S26). FIG. 19 illustrates details of output suppression processing of the power conditioner 31*a* executed in step S26. This output suppression processing starts upon arrival of the start time of PV suppression determined in accordance with the suppression instruction acquired from the power server 14.

Figure 19:
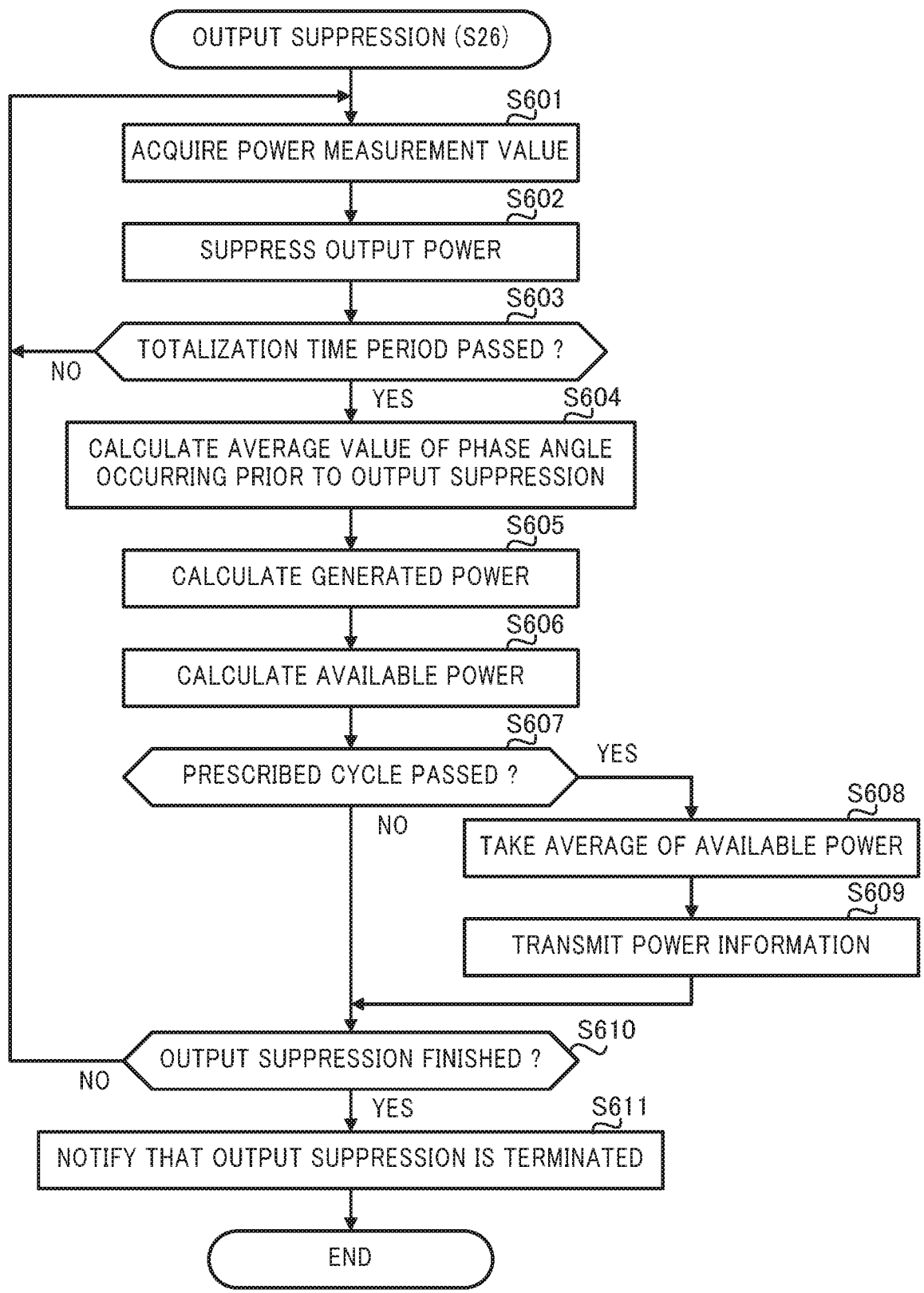
FIG. 19 is a flowchart illustrating a flow of output suppression processing executed by the power conditioner.

Upon the start of the output suppression processing illustrated in FIG. 19, the controller 33 of the power conditioner 31*a* acquires the measurement values of the purchased power P1 and the output power P2 acquired by CT1 and CT2 (step S601). Then, on the basis of the acquired measurement values of the power P1 and the power P2, the controller 33 suppresses the output power P2 by controlling phrase of the power output from the power conditioner 31*a* (step S602). In step S601, the controller 33 functions as the measurement value acquirer 301 and in step S602, the controller 33 functions as the power outputter 305.

Upon suppression of power output, the controller 33 determines whether or not a totalization time period after the start of the PV suppression or after the previous available power calculation time is passed (step S603). The "totalization time period" is the period for calculation of the available power, and for example, is set to a time such as 3 minutes, 5 minutes, or the like.

In the case in Which the totalization time period is not passed (NO in step S603), the controller 33 returns the processing to step S601. Until passage of the totalization time period, the controller 33 acquires the measurement values of the power P1 and P2, and repeats the processing to suppress the output power P2.

Upon passage of the totalization time period (YES in step S603), the controller 33 calculates the average value of the phase angle occurring prior to output suppression (step S604). Specifically, the controller 33 calculates the average value of the phase angles occurring in the predetermined period (for example, 5 minutes or 10 minutes) immediately prior to the start of the execution period of PV suppression.

Upon calculation of the average value of the phase angles, the controller 33, on the basis of the calculation result, calculates the generated power (step S605). Specifically, the controller 33 calculates the power factor of the output power P2 by calculating the cosine of the average value of the phase angle, and multiplies the obtained power factor by the rated power of the generated power Pa. By such processing, the controller 33 calculates the estimation value of the generated power Pa occurring in the execution period of PV suppression.

Upon calculation of the generated power Pa, the controller 33 calculates the available power by subtracting the measurement value of the output power P2 from the calculated estimation value of the generated power Pa (step S606). By such processing, the controller 33 estimates the power that is not output from the power conditioner 31a despite the ability of apparatuses in the home H including the water heater 5a to consume such power in the execution period of PV suppression. In step S603 through step S606, the controller 33 functions as the available power calculator 306.

Upon calculation of the available power, the controller 33 determines whether or not there is passage of a prescribed cycle (S607). The prescribed cycle is a period set for determining the timing of transmission of the available power information to the water heater 5a and for example, is set to 30 minutes. If the prescribed cycle since the immediately previous transmission timing is not passed (NO in step S607), the controller 33 skips the processing of step S608 and step S609.

When the prescribed cycle is passed since the immediately previous transmission timing (YES in step S607), the controller 33 averages the available power calculated for the period since the immediately pervious transmission timing up to the present time (step S608). Then the controller 33 generates power information indicating the averaged available power, and transmits the power information to the water heater 5a (step S609). The controller 33 functions as the power information transmitter 307 during step S608 and step S609.

Thereafter, the controller 33 determines whether or not the output suppression is finished (step S610). If output suppression is not completed (NO in step S610), then the controller 33 returns the processing to step S601. The controller 33 repeats the processing from step S601 through step S610 until the completion of the output suppression.

Finally, upon completion of the output suppression (YES in step S610), the controller 33 notifies the water heater 5a that the output suppression is terminated (step S611). Due to this processing, the output suppression processing of the power conditioner 31a illustrated in FIG. 19 ends.

In parallel with the output suppression processing of the power conditioner 31a occurring in step S26, the hot-water supply controller 54a executes daytime water heat-up processing (step S27). This daytime water heat-up processing starts upon arrival of the start time of PV suppression determined by the instruction information acquired from the power conditioner 31a. The details of the daytime water heat-up processing is similar to the processing illustrated in FIG. 14 except for replacement of the term "generated power" by the term "available power". Therefore, a detailed description of the processing is omitted here.

As described above, according to the hot-water supply system 1a of Embodiment 2, in the execution period of PV suppression, the power conditioner 31a calculates as the available power of the power generator 3a the difference between the generated power Pa generated by the PV panel 30 and the power P2 output from the power conditioner 31a, and the water heater 5a heats up water at the capacity corresponding to the available power. Such operation enables a decrease in power generation loss occurring during the suppression of PV power, and enables an improvement in utilization efficiency of power.

MODIFIED EXAMPLES

Although embodiments of the present disclosure are described above, modifications and applications based on various aspects are available in implementing the present disclosure.

For example, in Embodiments 1 and 2, the water heat-up unit 604 heats up water by changing the rotation of the electric motor in accordance with the history of the generated power. However, in the present disclosure, the water heat-up unit 604 may acquire a measurement value of present generated power instead of past generated power and heat up water by changing the rotation rate of the electric motor in accordance with present generated power. The rotation rate can be adjusted more accurately by using real-time information such as the present power generated.

In Embodiment 1 and 2, the power conditioners 31 and 31a acquire measurement values of the purchased power P1 and the generated power P2 and transmit the power information indicating these measurement values to the water heaters 5 and 5a respectively. However, in the present disclosure, the hot-water supply controllers 54 and 54a themselves may acquire measurement values of the purchased power P1 and the generated power P2 and heat up water by changing the rotation rate of the electric motor based on the acquired measurement values.

In Embodiments 1 and 2, the hot-water supply controllers 54 and 54a respectively include a function that changes the rotation rate of the electric motor in accordance with the generated power. However, in the present disclosure, an external apparatus of the water heaters 5 and 5a may include a function that changes the rotation rate of the electric motor in accordance with the generated power. The term "external apparatus" is, for example, the power conditioners 31 and 31a, a controller that controls the all of the apparatuses within the home H, a server connected via a wide-area network N, or the like. In a case in which, for example, the manufacturer of an external apparatus is different from the manufacturer of the water heaters 5 and 5a, cooperation within the system is difficult. By including a function that changes the rotation rate of the electric motor in accordance with generated power within the components of the water heaters 5 and 5a such as the hot-water supply controllers 54 and 54a, a monitor, and the like, the water heaters 5 and 5a can run as long as power information can be acquired. Therefore, the aforementioned hot-water supply systems 1 and 1a can be easily achieved.

Also, the water heat-up unit 604 may heat up water by changing the rotation rate of the electric motor in accordance with a difference between the generated power and consumed power of apparatuses other than the water heaters 5 and 5a in the home H that is the power-consuming area in which the water heater 5 is installed. Specifically, in the house H, the apparatuses 7-1, 7-2, and the like exist that also consume power in addition to the water heaters 5 and 5a. Therefore, the power (referred to as surplus power) obtained by subtracting consumed power of apparatuses in the home H other than the water heater 5 from the generated power can be used as criteria for defining the rotation rate of the electric motor. In doing so, the surplus power can be effectively utilized. In such a case, the generated power may be present generated power or may be based on the history of generated power. Also, an average value in a prescribed time may be used as the generated power. The consumed power by apparatuses other than the water heaters 5 and 5a in the home H is obtained by subtracting the power P3 consumed by the water heater measured by CT3 from the total power consumed Pc.

Also, in Embodiments 1 and 2, electric motor is designed such that the voltage applied to the electric motor reaches the maximum voltage in a segment of the plurality of segments included between the maximum value and the minimum value of the rotation rate, the segment of the plurality of segments being a segment containing the rotation rate that is during consumption by the compressor 81 of the averaged power of power generated. However, in the present disclosure, the electric motor may be designed such that the voltage applied to the electric motor reaches a maximum voltage in a segment, among the plurality of segments, containing the rotation rate that is during consumption by the compressor 81 of the maximum power generated by the power generators 3 and 3*a*. The maximum power generated by the power generators 3 and 3*a* is maximum power that can be generated by the power generators 3 and 3*a*, and determined by the capacity of the PV panel 30 and the respective capacities of the power conditioners 31 and 31*a* Specifically, there are cases in which the maximum value of the reverse flow of power is preferably reduced by, for example, a breaker capacity limit, a limit of a reverse flow of power, and/or the like. In such cases, the maximum value of the reverse flow of power can be reduced by designing the electric motor such that efficiency is greatest when the compressor 81 consumes the maximum power generated by the power generators 3 and 3*a*.

Further, in the case in which the electric motor is designed such that the voltage applied to the electric motor reaches the maximum voltage in a segment, among the plurality of segments, containing the rotation rate that is during consumption by the compressor 81 of the power determined in accordance with the generated power the hot-water supply systems 1 and 1*a* need not change the rotation rate in accordance with the generated power. As long as water can be heated by the generated power, the rotation rate of the electric motor may be designed as appropriate to increase the efficiency of the electric motor. Further, in the case in which the electric motor is designed such that the voltage applied to the electric motor reaches the maximum voltage in a segment, among the plurality of segments, containing the rotation rate that is during consumption by the compressor 81 of the power determined in accordance with the generated power the generated power may be replaced by surplus power or available power.

Moreover, in the aforementioned Embodiment 2, the available power calculator 306 calculates as the available power the difference between the generated power Pa and the output power P2 occurring in the execution period of PV suppression, that is, the actual lost power occurring at the power generator 3*a* However, the available power may be defined by another method, as long as the available power is power based on the difference between the output power P2 and the generated power Pa occurring in the execution period of PV suppression. For example, in order to secure a margin, the available power can be determined as the power obtained by subtracting a predetermined margin from the difference (lost power) between the output power P2 and the generated power Pa occurring in the execution period of PV suppression.

Alternatively, the available power calculator 306 may calculate as the available power a power value found by adding the reverse flow power to the difference (lost power) between the output power P2 and the generated power Pa occurring in the execution period of PV suppression. Specifically, the available power calculator 306 may add the measurement value of the reverse flow power (−P1) acquired by the measurement value acquirer 301 to the difference between the power Pa generated by the PV panel 30 and the power P2 output by the power outputter 305, thereby calculating the available power. By the available power calculator 306 calculating available power including the reverse flow power, and by the available power information transmitter 307 sending the available power information indicating such available power to the water heater 5*a*, more power can be used in the water heat-up operation of the water heater 5*a*.

Further, in the aforementioned Embodiments 1 and 2, the power generators 3 and 3*a* are installed in the home H. However, the power generators 3 and 3*a* may be arranged on premises separated from the home and may supply power from a location remote from the home H, as long as the power generators 3 and 3*a* are those of power systems separate from the commercial electrical power grid 8. In this case, the demand region includes the location where the power generators 3 and 3*a* are arranged. Further, the demand region is not limited to a general residence such as the aforementioned home H, but may be collective housing, a facility, a building, a factory, or the like, as long as the power-consuming area consumes power from the power generators 3 and 3*a* and the commercial electrical power grid 8. Also, the power generators 3 and 3*a* are not limited to those that generate power from sunlight. The power generators 3 and 3*a* may be those that generate power from wind energy or geothermal energy.

In the aforementioned Embodiments 1 and 2, the controller 33 of the power conditioners 31 and 31*a* functions as each of the measurement value acquirer 301, the instruction acquirer 303, the instruction information transmitter 304, the power outputter 305, the available power calculator 306, the power information transmitter 307, and the display controller 309 by the CPU executing the program stored in the ROM or storage 36. Further, the controller 61 of the hot-water supply controllers 54 and 54*a* functions as each of the instruction information acquirer 601, the plan generator 602, the power information acquirer 605, the water heat-up unit 604, and the display controller 608 by the CPU executing the program stored in the ROM or storage 62. However, in the present disclosure, the controller 33 and the controller 61 may be dedicated hardware. The term "dedicated hardware" means, for example, a single circuit, a composite circuit, a programmed processor, an application specific integrated circuit (ASIC), a field-programmable gate array (FPGA), combinations thereof, or the like. When the controller 33 and the controller 61 are dedicated hardware, the functions of each component may be achieved by separate respective hardware, or may be achieved collectively by a single hardware unit.

Further, among each of the functions, a portion may be achieved using dedicated hardware, and the other portion may be achieved by software or firmware. In this manner, the controller 33 and the controller 61 can achieve the aforementioned various functions by hardware, software, firmware, or a combination of such.

An operating program specifying the operations of the power conditioners 31 and 31*a*, and the hot-water supply controllers 54 and 54*a* according to the present disclosure can be used with an existing personal computer, an information terminal device, or the like, thereby enabling the personal computer, the information terminal device, or the like to function as the power conditioners 31 and 31*a*, and the hot-water supply controllers 54 and 54*a*.

Further, any method may be used for distribution of such a program, and for example, the program may be stored and distributed on a computer-readable recording medium such as a compact disc read-only memory (CD-ROM), a digital versatile disc (DVD), a magneto-optical (MO) disc, a memory card, or the like, and the program may be distributed through a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be used with advantage for a system and the like for managing power.

REFERENCE SIGNS LIST 1, 1a Hot-water supply system
3, 3a Power generator
5, 5a Water heater
7 (7-1, 7-2, . . . ) Apparatus
8 Commercial electrical power grid
9 Power distribution panel
12 Router
14 Power server
30 PV panel
31, 31a Power conditioner
32 Inverter
33, 61 Controller
34 Generated power calculator
35 Status manager
36, 62 Storage
37, 64 Communicator
38 Communication adapter
40 Display
50 Heat pump unit
51 Tank unit
52 Water piping
53 Hot-water storage tank
54 and 54a Hot-water supply controller
55 Remote controller
56 Mixing valve
57 Shower
58 Faucet
59 Communication line
63 Timer
69 Bus
80 Refrigerant piping
81 Compressor
82 First heat exchanger
83 Expansion valve
84 Second heat exchanger
85 Air fan
86 Water pump
89 Control board
90 Server
301 Measurement value acquirer
303 Instruction acquirer
304 Instruction information transmitter
305 Power outputter
306 Available power calculator
307 Power information transmitter
308 Output information transmitter
309, 608 Display controller
310 Measurement DB
320 Instruction DB
601 Instruction information acquirer
602 Plan generator
604 Water heat-up unit
605 Power information acquirer
609 Operation receiver
610 Learning DB
D1-D5 Power line
H Home
N Wide-area network

The invention claimed is:

1. A hot-water supply system for heating up water by power generated by a power generation unit, the hot-water supply system comprising:
a power conditioner; and
a water heater,
the power conditioner comprising:
an instruction acquirer configured to acquire a suppression instruction that instructs the power conditioner to suppress supplying of the generated power to a commercial electrical power grid, wherein the suppression instruction designates a predefined period of suppressing reverse flow of power to the commercial electrical power grid; and
a power outputter configured to output, from the power conditioner to a power-consuming area in which the water heater is installed, in the predefined period designated by the suppression instruction, power that is less than the generated power by suppressing output of the generated power from the power conditioner to the power-consuming area, and
the water heater comprising:
a compressor configured to compress refrigerant and circulate the refrigerant through a refrigerant circuit; and
a water heating unit configured to heat up water by changing, in the predefined period, in accordance with a difference between the generated power and the power output from the power conditioner to the power-consuming area, a rotation rate of an electric motor for driving the compressor, wherein
the power output from the power conditioner to the power-consuming area is supplied to the commercial electrical power grid when exceeding a total consumed power of the power-consuming area.

2. The hot-water supply system according to claim 1, wherein the water heating unit heats up the water by changing the rotation rate in accordance with a history of available power that is power based on the difference.

3. The hot-water supply system according to claim 1, wherein the water heating unit heats up the water by changing the rotation rate in accordance with available power that is power based on the difference and an amount of change in the available power per unit of time.

4. The hot-water supply system according to claim 1, wherein the water heating unit heats up the water by changing the rotation rate in accordance with an average value of available power that is power based on the difference in a prescribed period and an amount of change in the average value per unit of time.

5. The hot-water supply system according to claim 4, wherein the prescribed period is no less than one minute and no greater than two hours.

6. The hot-water supply system according to claim 1, wherein the water heating unit heats up the water by changing the rotation rate in accordance with available power that is power based on the difference and a time when the available power peaks in one day.

7. The hot-water supply system according to claim 1, wherein a voltage that is applied to the electric motor reaches a voltage at which the electric motor begins an over-modulation operation, in a segment of a plurality of segments included between a maximum value and a minimum value of the rotation rate, the segment of the plurality of segments being a segment containing the rotation rate that is during consumption by the compressor of power determined in accordance with the generated power.

8. The hot-water supply system according to claim 7, wherein the power determined in accordance with the generated power is an averaged power of the power generated in a period during which power is generated by the power generation unit.

9. The hot-water supply system according to claim 7, wherein the power determined in accordance with the generated power is a maximum power generated by the power generation unit.

10. The hot-water supply system according to claim 1, wherein
the power conditioner further comprises a power information transmitter configured to transmit, to the water heater, power information indicating the difference between the generated power and the power output from the power conditioner, and
the water heater further comprises a power information receiver for receiving the power information from the power conditioner.

11. A control method for a water heater for heating up water by power generated by a power generation unit, the control method comprising:
acquiring by a power conditioner a suppression instruction that instructs the power conditioner to suppress supplying of the generated power to a commercial electrical power grid, wherein the suppression instruction designates a predefined period of suppressing reverse flow of power to the commercial electrical power grid;
outputting from the power conditioner to a power-consuming area in which the water heater is installed, in the predefined period designated by the suppression instruction, power that is less than the generated power by suppressing output of the generated power from the power conditioner to the power-consuming area; and
heating up the water by changing, in the predefined period, in accordance with a difference between the generated power and the power output from the power conditioner to the power-consuming area, a rotation rate of an electric motor for driving a compressor of the water heater, wherein
the power output from the power conditioner to the power-consuming area is supplied to the commercial electrical power grid when exceeding a total consumed power of the power-consuming area.

12. The control method according to claim 11, wherein the heating up the water changes the rotation rate in accordance with a history of available power that is power based on the difference.

13. The control method according to claim 11, wherein heating up the water heats up the water by changing the rotation rate in accordance with available power that is power based on the difference and an amount of change in the available power per unit of time.

14. The control method according to claim 11, wherein the heating up the water heats up the water by changing the rotation rate in accordance with an average value of available power that is power based on the difference in a prescribed period and an amount of change in the average value per unit of time.

15. The control method according to claim 14, wherein the prescribed period is no less than one minute and no greater than two hours.

16. The control method according to claim 11, wherein the heating up the water heats up the water by changing the rotation rate in accordance with available power that is power based on the difference and a time when the available power peaks in one day.

17. The control method according to claim 11, further comprising, applying, to the electric motor, a voltage that reaches a voltage at which the electric motor begins an over-modulation operation, in a segment of a plurality of segments included between a maximum value and a minimum value of the rotation rate, the segment of the plurality of segments being a segment containing the rotation rate that is during consumption by the compressor of power determined in accordance with the generated power.

18. The control method according to claim 17, wherein the power determined in accordance with the generated power is an averaged power of the power generated in a period during which power is generated by the power generation unit.

19. The control method according to claim 17, wherein the power determined in accordance with the generated power is a maximum power generated by the power generation unit.

* * * * *